(12) United States Patent
Vikberg et al.

(10) Patent No.: US 11,343,721 B2
(45) Date of Patent: May 24, 2022

(54) COMMUNICATION DEVICE, NETWORK NODES AND METHODS PERFORMED THEREIN FOR HANDLING COMMUNICATION IN A COMMUNICATION NETWORK

(71) Applicant: Telefonaktiebolaget LM Ericsson (publ), Stockholm (SE)

(72) Inventors: Jari Vikberg, Järna (SE); Tomas Hedberg, Nacka (SE); Håkan Olofsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 368 days.

(21) Appl. No.: 16/491,860

(22) PCT Filed: Mar. 8, 2017

(86) PCT No.: PCT/SE2017/050210
§ 371 (c)(1),
(2) Date: Sep. 6, 2019

(87) PCT Pub. No.: WO2018/164612
PCT Pub. Date: Sep. 13, 2018

(65) Prior Publication Data
US 2021/0144592 A1    May 13, 2021

(51) Int. Cl.
*H04W 36/00* (2009.01)
*H04W 76/15* (2018.01)
(Continued)

(52) U.S. Cl.
CPC ..... *H04W 36/0016* (2013.01); *H04L 41/0806* (2013.01); *H04W 8/08* (2013.01);
(Continued)

(58) Field of Classification Search
CPC ... H04W 12/062; H04W 36/08; H04W 36/14; H04W 60/00; H04W 36/0005; H04W 60/005; H04L 67/16; H04L 63/08
See application file for complete search history.

(56) References Cited

U.S. PATENT DOCUMENTS 8,538,430 B1 *  9/2013  Filiatrault ......... H04W 36/0016
                                                  455/437
8,594,026 B1 * 11/2013  Hirschman ........... H04W 60/00
                                                  370/329

(Continued)

FOREIGN PATENT DOCUMENTS

WO    2008115757 A1    9/2008

OTHER PUBLICATIONS

Unknown, Author, "3rd Generation Partnership Project; Technical Specification Group Services and System Aspects; Architecture enhancements for non-3GPP accesses (Release 14)", 3GPP TS 23.402 V14.2.0, Dec. 2016, pp. 1-307.
(Continued)

*Primary Examiner* — Dung Hong
(74) *Attorney, Agent, or Firm* — Murphy, Bilak & Homiller, PLLC

(57) ABSTRACT

Method performed by a communication device (10) for handling communication in a communication network comprising at least a first wireless communication network (11) and a second wireless communication network (14), which communication device (10) is served by a radio network node (13) in the second wireless communication network (14). The communication device (10) performs a preparation signaling, via the radio network node (13) and transparently through the second wireless communication network (14), to a first network node (12) of the first wireless communication network (11) for preparing the first network node (12) with
(Continued)

a pre-configuration for serving the communication device (10).

19 Claims, 20 Drawing Sheets

(51) Int. Cl.
    *H04W 76/10*     (2018.01)
    *H04L 41/0806*   (2022.01)
    *H04W 8/08*      (2009.01)
    *H04W 12/06*     (2021.01)
    *H04W 36/14*     (2009.01)
    *H04W 84/04*     (2009.01)

(52) U.S. Cl.
    CPC ........... *H04W 12/06* (2013.01); *H04W 36/14* (2013.01); *H04W 76/10* (2018.02); *H04W 76/15* (2018.02); *H04W 84/042* (2013.01)

(56) References Cited

U.S. PATENT DOCUMENTS

| | | | | |
|---|---|---|---|---|
| 8,842,632 | B2* | 9/2014 | Zou | H04W 60/04 455/442 |
| 9,253,747 | B1* | 2/2016 | Saleh | H04W 60/04 |
| 2004/0264414 | A1* | 12/2004 | Dorenbosch | H04W 36/14 370/332 |
| 2009/0286534 | A1* | 11/2009 | Garg | H04W 36/10 455/432.1 |
| 2010/0075680 | A1* | 3/2010 | Ramachandran | H04W 60/04 455/436 |
| 2010/0226267 | A1* | 9/2010 | Jang | H04W 52/40 370/252 |
| 2010/0284370 | A1* | 11/2010 | Samar | H04W 36/0016 370/331 |
| 2010/0304737 | A1* | 12/2010 | Jain | H04W 36/0066 455/552.1 |
| 2011/0044264 | A1* | 2/2011 | Chen | H04W 36/245 370/329 |
| 2012/0051243 | A1* | 3/2012 | Faye | H04W 48/18 370/252 |
| 2013/0100795 | A1* | 4/2013 | Zhao | H04W 36/0016 370/216 |
| 2015/0373661 | A1* | 12/2015 | Fulzele | H04W 60/005 455/435.2 |
| 2016/0277991 | A1* | 9/2016 | Yang | H04W 56/001 |

OTHER PUBLICATIONS

Unknown, Author, "3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.0.0, Jun. 2016, pp. 1-374.

* cited by examiner

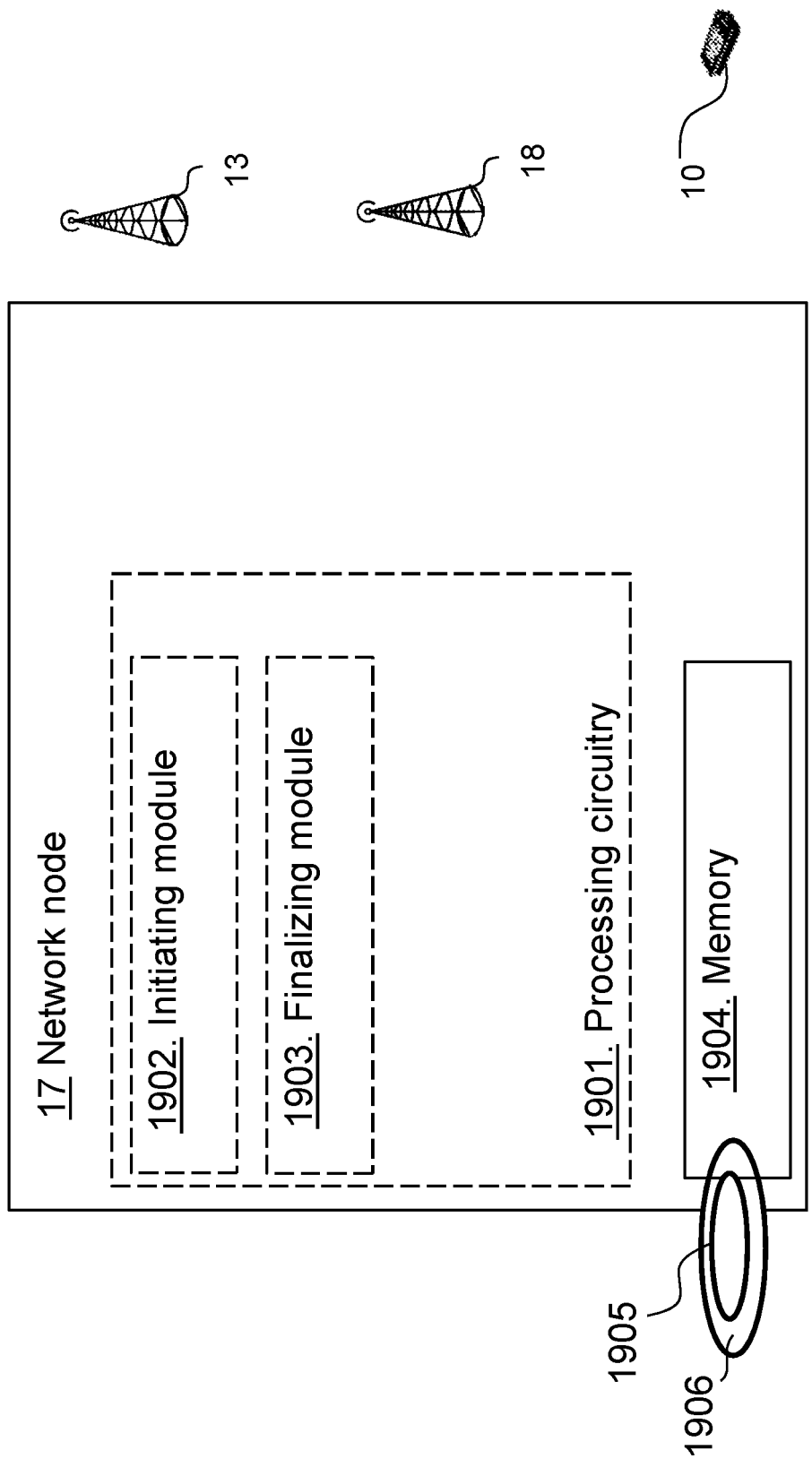

COMMUNICATION DEVICE, NETWORK NODES AND METHODS PERFORMED THEREIN FOR HANDLING COMMUNICATION IN A COMMUNICATION NETWORK

TECHNICAL FIELD

Embodiments herein relate to a communication device, a first network node and a network node and methods performed therein for communication. Furthermore, a computer program and a computer readable storage medium are also provided herein. In particular, embodiments herein relate to handling communication in a communication network.

BACKGROUND

In a typical communication network, communication devices, also known as wireless devices or user equipments (UEs), communicate via a Radio Access Network (RAN) to one or more core networks for example for using a Mobile broadband service. Mobile Broadband services are demanded in more and more locations, also indoors. Enterprises are increasingly operating also out of the enterprise premises, requiring the same connectivity and services inside and outside the office. There is a trend of Bring-your-own-device (BYOD), implying that enterprise personnel e.g. employees, consultants, etc., bring their own communication devices, usually associated with or even locked to a specific operator. The enterprise will thus often need to support several operators. A simple way is that all operators provide sufficiently good indoor coverage, which usually implies indoor network for all operators. However, this option is not cost efficient, due to amount of radio equipment needed to cover many frequency bands. From a cost perspective it is preferred to use a single radio chain for all communication devices, i.e. one spectrum band.

There is thus a cost reduction potential by designing shared wireless communication network indoors. Current regulations and business logic imply that existing outdoor wireless communication networks will remain separate in most cases. One possible scenario is the following, where there are two wireless communication networks A and B with different network identities, in current cellular systems denoted Public Land Mobile Network (PLMN), mainly outdoors, and an e.g. indoor PLMN X, which PLMN A and PLMN B users should be able to use while positioned indoors. Thus, there are multiple outdoor systems PLMN A and PLMN B operated by separate operators, and islands of local systems PLMN X operated by one of operators PLMN A and PLMN B, or by a separate company, see FIG. 1. The wireless communication networks may use licensed spectrum, unlicensed spectrum, or a mix of the two, or, indeed, hybrid spectrum licensing regimes. The above scenario can be seen as a roaming case, i.e. a communication device will move between PLMN A/B outdoors and PLMN x indoors.

Another possible scenario is that the indoor wireless communication network (re-)uses the same PLMN A and/or PLMN B, but on a different spectrum than those used by the outdoor parts of PLMN A/B. The indoor wireless communication network is expected to be managed by another organization than those of the Mobile Network Operators (MNO) and with minimal planning coordination between indoor and outdoor parts. This scenario can be implemented in different ways, typically a Multi Operator Core Network (MOON) configuration, where each cell or service area supports both PLMN A and PLMN B, or a Mobile Operator Radio Access Network (MORAN) configuration, where some cells indicate PLMN A and other cells indicate PLMN B. In this scenario the "indoor network" is a RAN part of the overall PLMN A/B network.

One implication of the separate management of wireless communication networks, such as indoor and outdoor networks, is that the normal tight coordination of adjacent wireless communication networks is not practical or efficient resulting in a limited or reduced performance of the communication network.

SUMMARY

An object of embodiments herein is to provide a mechanism for improving the performance of a communication network allowing communication devices to move between different wireless communication networks in an efficient manner.

According to an aspect the object is achieved by providing a method performed by a communication device for handling communication in a communication network. The communication network comprises least a first wireless communication network and a second wireless communication network, and the communication device is served by a radio network node in the second wireless communication network. The communication device performs a preparation signaling, via the radio network node and transparently through the second wireless communication network, to a first network node of the first wireless communication network or preparing the first network node with a pre-configuration for serving the communication device.

According to another aspect the object is achieved by providing a method performed by a first network node, such as a Mobility Management Entity (MME) or a Home Subscriber Server (HSS), for handling communication of a communication device in a communication network comprising at least a first wireless communication network and a second wireless communication network. The first network node is comprised in the first wireless communication network and the communication device is served by a radio network node comprised in the second wireless communication network. The network node performs a preparation signaling with the communication device, via the radio network node and transparently through the second wireless communication network, for preparing the first network node with a pre-configuration for serving the communication device.

According to yet another aspect the object is achieved by providing a method performed by a network node, such as an MME, for handling communication of a communication device in a communication network comprising at least a first wireless communication network and a second wireless communication network. The network node is comprised in the first wireless communication network and the communication device is served by a radio network node comprised in the second wireless communication network. The network node initiates an abbreviated access process, for the communication device, to the first wireless communication network. The abbreviated access process comprises: receiving, from the communication device, an access indication indicating the abbreviated access process, and a preparation indication referencing a pre-configuration for serving the communication device, which pre-configuration is configured from a preparation signaling from the communication device in the second wireless communication network; and retrieving information related to the pre-configuration for serving the communication device for the initiated abbreviated access process using the preparation indication.

It is furthermore provided herein a computer program comprising instructions, which, when executed on at least one processor, cause the at least one processor to carry out any of the methods above, as performed by the network nodes, or the communication device. It is additionally provided herein a computer-readable storage medium, having stored thereon a computer program comprising instructions which, when executed on at least one processor, cause the at least one processor to carry out the method according to any of the methods above, as performed by the network nodes, or the communication device.

According to still another aspect the object is achieved by providing a communication device for handling communication in a communication network comprising at least a first wireless communication network and a second wireless communication network. The second wireless communication network comprises a radio network node configured to serve the communication device. The communication device is configured to perform a preparation signaling, via the radio network node and transparently through the second wireless communication network, to a first network node of the first wireless communication network for preparing the first network node with a pre-configuration for serving the communication device.

According to yet still another aspect the object is achieved by providing a first network node for handling communication of a communication device in a communication network comprising at least a first wireless communication network and a second wireless communication network. The first network node is configured for the first wireless communication network, and which communication device is served by a radio network node comprised in the second wireless communication network. The first network node is configured to perform a preparation signaling with the communication device, via the radio network node and transparently through the second wireless communication network, for preparing the first network node with a pre-configuration for serving the communication device.

According to another aspect the object is achieved by providing a network node, e.g. the first network node or another network node, for handling communication of a communication device in a communication network comprising at least a first wireless communication network and a second wireless communication network. The network node is configured for the first wireless communication network and the communication device is served by a radio network node comprised in the second wireless communication network. The network node is configured to initiate an abbreviated access process, for the communication device, to the first wireless communication network by being configured to receive, from the communication device, an access indication indicating the abbreviated access process, and a preparation indication referencing a pre-configuration for serving the communication device, which pre-configuration is configured from a preparation signaling from the communication device in the second wireless communication network. The network node is further being configured to retrieve information related to the pre-configuration for serving the communication device for the initiated abbreviated access process using the preparation indication.

Embodiments herein minimizes mobility transfer time for the communication device between a current wireless communication network and at least one surrounding wireless communication network, without the need for business nor technical coordination between the network operators. Thus, embodiments herein allow the communication device to find and move between wireless communication networks when moving in and out of e.g. buildings or other "islands" of shared wireless communication networks in an efficient manner. This results in an improved performance of the communication network.

BRIEF DESCRIPTION OF THE DRAWINGS

Embodiments will now be described in more detail in relation to the enclosed drawings, in which:

FIG. 19 shows a block diagram depicting a network node according to embodiments herein.

DETAILED DESCRIPTION

Figure 1:
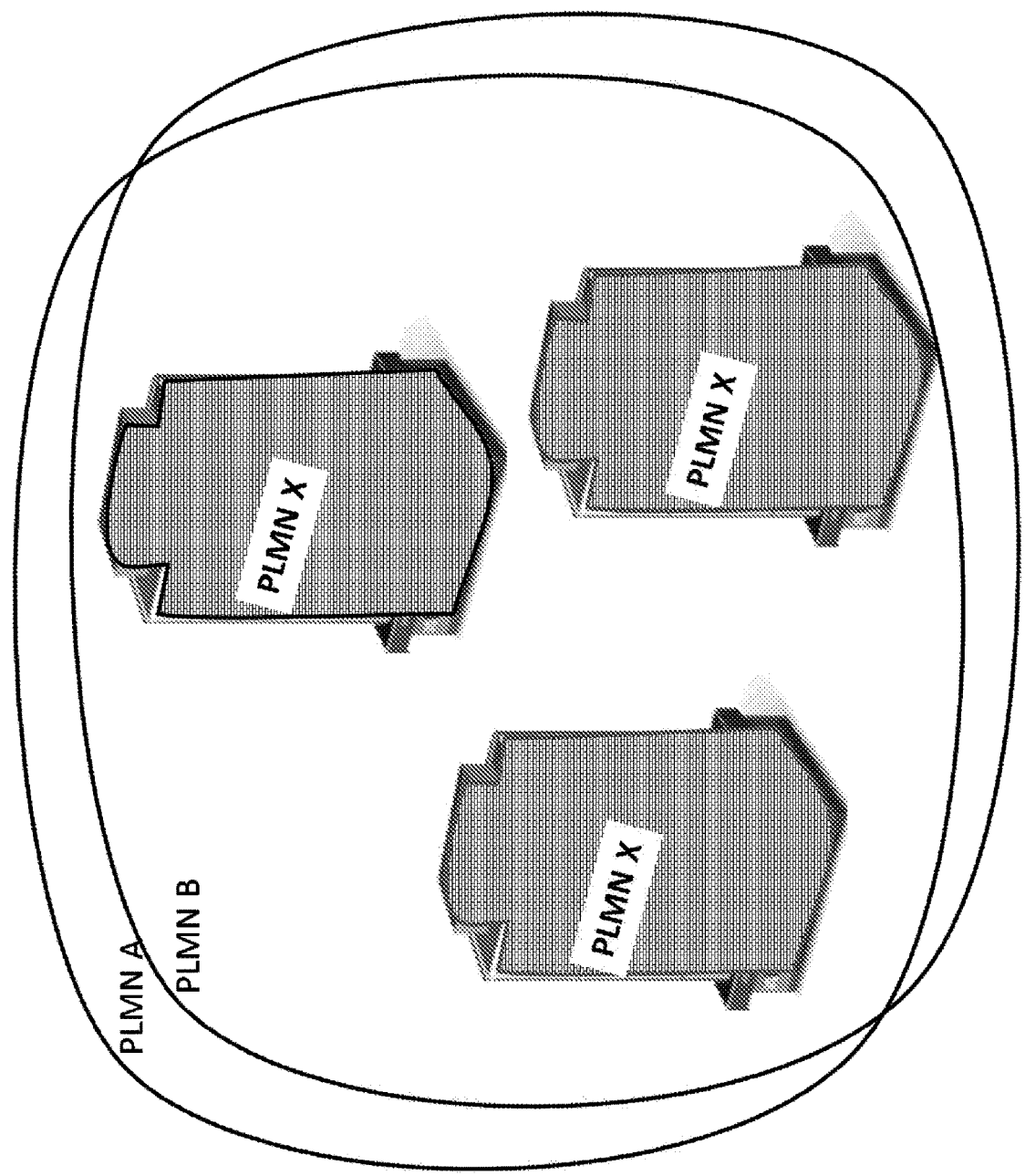
FIG. 1 is a schematic overview depicting a communication network comprising a multiple of wireless communication networks.

Current solutions for inter-network mobility have several shortcomings mainly in the areas of interactions and dependencies between operators, mobility performance and communication device-impact (single radio vs dual radio support).

Operators want to minimize interaction and dependencies between each other, e.g. to simplify the work and to reduce leakage of information about the wireless communication network and its subscribers to other operators. The MOCN, Gateway Core Network (GWCN) and roaming solutions contain the need for such interactions and dependencies.

The known roaming solutions result in poor performance when the communication device moves between different 3GPP wireless communication networks. There are multiple reasons for this poor performance and three examples are described in the following. Firstly, the communication device prefers to stay in a wireless communication network such as a first PLMN until coverage of this wireless communication network is completely lost. Secondly, the communication device does not normally know where in the frequency/channel domain to search for a new wireless communication network, and therefore the search for a new wireless communication network can take several minutes. Thirdly, once the communication device has detected a new wireless communication network, it will start performing a complete Attach procedure including authentication as Mobility Management signaling and additional Session Management signaling to establish user plane connectivity.

3GPP mobility may be based on the classical single radio communication device architecture. This is a consequence of the fact that different wireless communication networks, or segments of the same wireless communication network, may select carrier frequencies rather independently and may thus be placed so that two radios inside one communication device cannot operate simultaneously, due to interference and intermodulation.

Dual/multi radio means that the communication device can simultaneously operate several radios and connections and it can thus communicate with multiple wireless communication networks simultaneously. This largely eliminates the need for inter-network mobility, since the communication device is already connected to the wireless communication networks needed. A new issue is rather how to allocate services per wireless communication network. The main drawback is that multi-radio operation is often not realistic. If radio channels are too close to each other, have frequency relations creating spurious interference, etc. then dual/multi radio operation can be disabled. The nature of different wireless communication networks is that they are not co-planned, which makes problem cases rather frequent, especially in cellular networks where wireless communication networks often use adjacent parts of the same frequency bands.

Mobility between 3GPP and non-3GPP wireless communication networks may be supported by "Wi-Fi calling", which is defined as Wi-Fi integration into LTE/EPC networks via SWu and S2b interfaces, see 3GPP TS23.402 v 14.2.0. Wi-Fi calling is based on dual radio support on the communication device side i.e. that the communication device is capable to operate simultaneously in both Wi-Fi and LTE/EPC networks, i.e. these solutions are not seen as feasible for single radio communication devices. The dual radio on communication device-side allows "make-before-break" type of operation. In addition, these solutions are also about giving the communication device access to a single wireless communication network i.e. even communication over Wi-Fi networks is integrated towards the user plane part of EPC also serving the current serving PLMN of the communication device. The "Wi-Fi calling" solution is based on an evolved Packet Data Gateway (ePDG) in the operator's network. The communication device establishes an IPsec tunnel to the ePDG using SWu interface and the ePDG is connected to a Packet Data Network-Gateway (PDN-GW) for user plane over S2b interface and towards Authentication, authorization, and accounting (AAA)/Home Subscriber Server (HSS) for authentication. The ePDG is not connected to the traffic control plane nodes in the operator's network, such as Mobility Management Entity (MME) in LTE/EPC networks. In addition, an obvious limitation is that the ePDG is not defined for mobility between 3GPP wireless communication networks.

Figure 2:
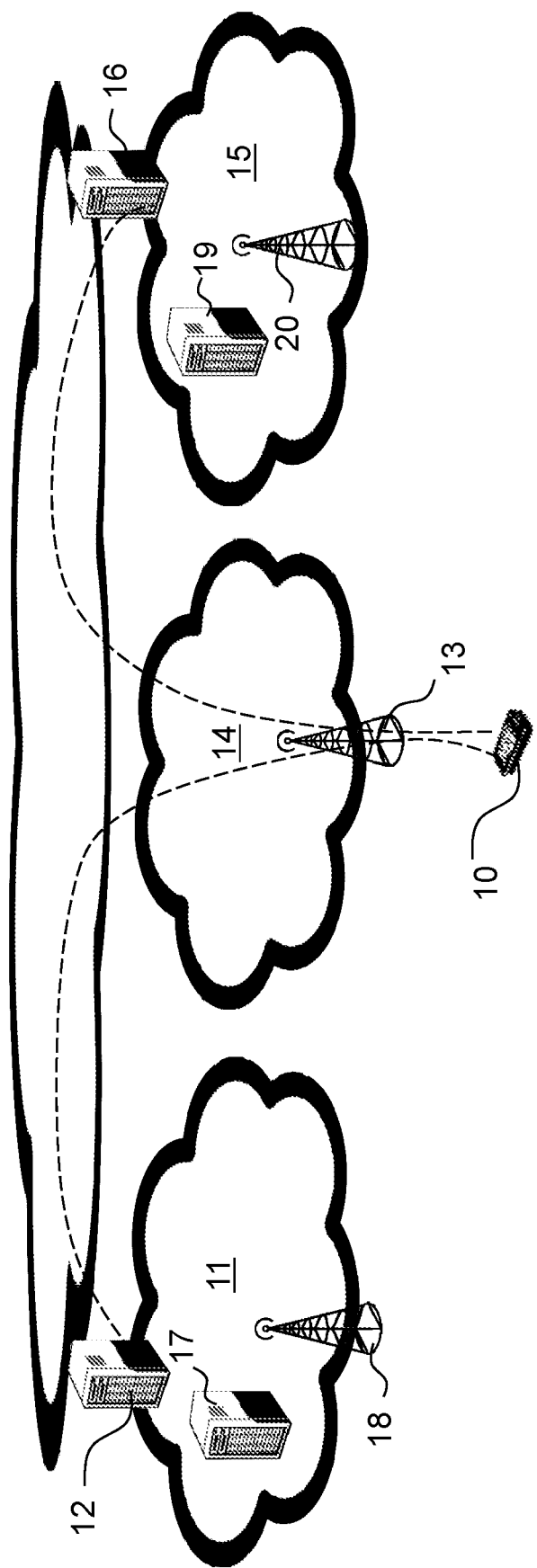
FIG. 2 is a schematic overview depicting a communication network according to embodiments herein.

Embodiments herein relate to communication networks in general. FIG. 2 is a schematic overview depicting a communication network according to embodiments herein. The communication network may comprise any one type or a combination of wireless communication networks using different technologies, such as New Radio, Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication networks such as e.g. WCDMA and LTE.

A communication device 10 such as a mobile station, a computer, a TV, a non-access point (non-AP) Station (STA), a STA, a user equipment and/or a wireless terminal communicates within the communication network. It should be understood by the skilled in the art that "communication device" is a non-limiting term which means any terminal, communications terminal, user equipment, or node e.g. smart phone, laptop, mobile phone, sensor, relay, or mobile tablet.

The communication network comprises a first wireless communication network 11 serving a geographical area of a first radio access technology (RAT), such as New Radio (NR), LTE, Wi-Fi or similar, and the first wireless communication network 11 comprises a first network node 12 e.g. a core network node such as a Home subscriber Server (HSS) or a Mobility Management Entity (MME). The first wireless communication network 11 may further comprise a network node 17 such as the MME or similar. The first wireless communication network 11 may in addition comprise a first access point 18 providing radio coverage over the geographical area or service area. The first access point 18 may be a transmission and reception point e.g. a radio network node such as a Wireless Local Area Network (WLAN) access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a communication device within the service area served by the first access point 18 depending e.g. on the first radio access technology and terminology used.

The communication device 10 is served by a radio network node 13, e.g. a radio access node providing radio coverage within a building or a limited area, of a second wireless communication network 14. The second wireless communication network 14 may be of a second RAT, such as NR, LTE, WiMAX or similar. The radio network node 13 may be a transmission and reception point e.g. a radio network node such as a WLAN access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a communication device within the area served by the radio network node 13 depending e.g. on the second RAT and terminology used. The radio network node 13 may be referred to as serving access point and communicates with the communication device 10 with DL transmissions to the communication device 10 and UL transmissions from the communication device 10.

Furthermore, the communication network may comprise a third wireless communication network 15 comprising a third network node 16 serving a geographical area of a third RAT, such as New Radio (NR), LTE, WiMAX or similar. The third network node 16 may be a core network node such as a HSS or an MME. The third wireless communication network 15 may further comprise an additional network node 19 such as the MME or similar. The third wireless communication network 15 may in addition comprise a third access point 20 providing radio coverage over the geographical area or service area. The first, second, and third RAT may be the same or different RATs.

Embodiments herein address the above related problems in the prior art and are for the purpose to improve inter-network mobility for communication devices with e.g. a single radio architecture. Embodiments herein prepare the communication device 10 in different target wireless communication networks on different levels such as pre-authentication, pre-attach or pre-establishment of user plane connectivity. The communication device 10, such as a single-radio communication device, performs, according to embodiments herein, preparation signaling towards the different wireless communication networks, i.e. the first and third wireless communication networks, via a user plane connectivity provided by the serving radio network node 13 transparently through the second wireless communication network 14. The different wireless communication networks are then independent or independently connected via a packet network such as the Internet. The communication device 10 may hold access credentials, such as SIM cards, for all the different wireless communication networks and can therefore be seen as a "multi-access credential" device that is also able to access multiple access credentials simultaneously locally in the communication device 10.

Embodiments herein provide a way to minimize mobility transfer time between a current wireless communication network 11 (provided by the radio network node 13) and at least one surrounding wireless communication network (provided by the first access point 17 or a third access point), without the need for business nor technical coordination between the network operators e.g. when operating in single-radio conditions. Single-radio conditions mean conditions when separate multiple radio paths are not feasible, e.g. due to the communication device with a single radio and/or unfortunate spacing of channels, creating intermodulation products that disable the radio parts to operate simultaneously.

The minimization of mobility transfer time is done by preparatory signaling between the communication device 10 and the first network node 12 and the third network node 16 of surrounding wireless communication networks via the current serving radio network node 13, in order to prepare surrounding wireless communication networks' configurations to a varying degree for the communication device 10.

It should be noted that the second wireless communication network 14 may be an indoor network and the first wireless communication network 11 and third wireless communication network 15 may be outdoor networks and embodiments herein focus on indoor system environments. However, any shared network island can occur and be a target for mobility or roaming. For example, outdoor arenas and other venues, industry production plants or storage facilities with outdoor parts, campuses, open mines, etc. The described indoor environment case should only be seen as one example of a confined environment where a shared network island is present.

Figure 3:
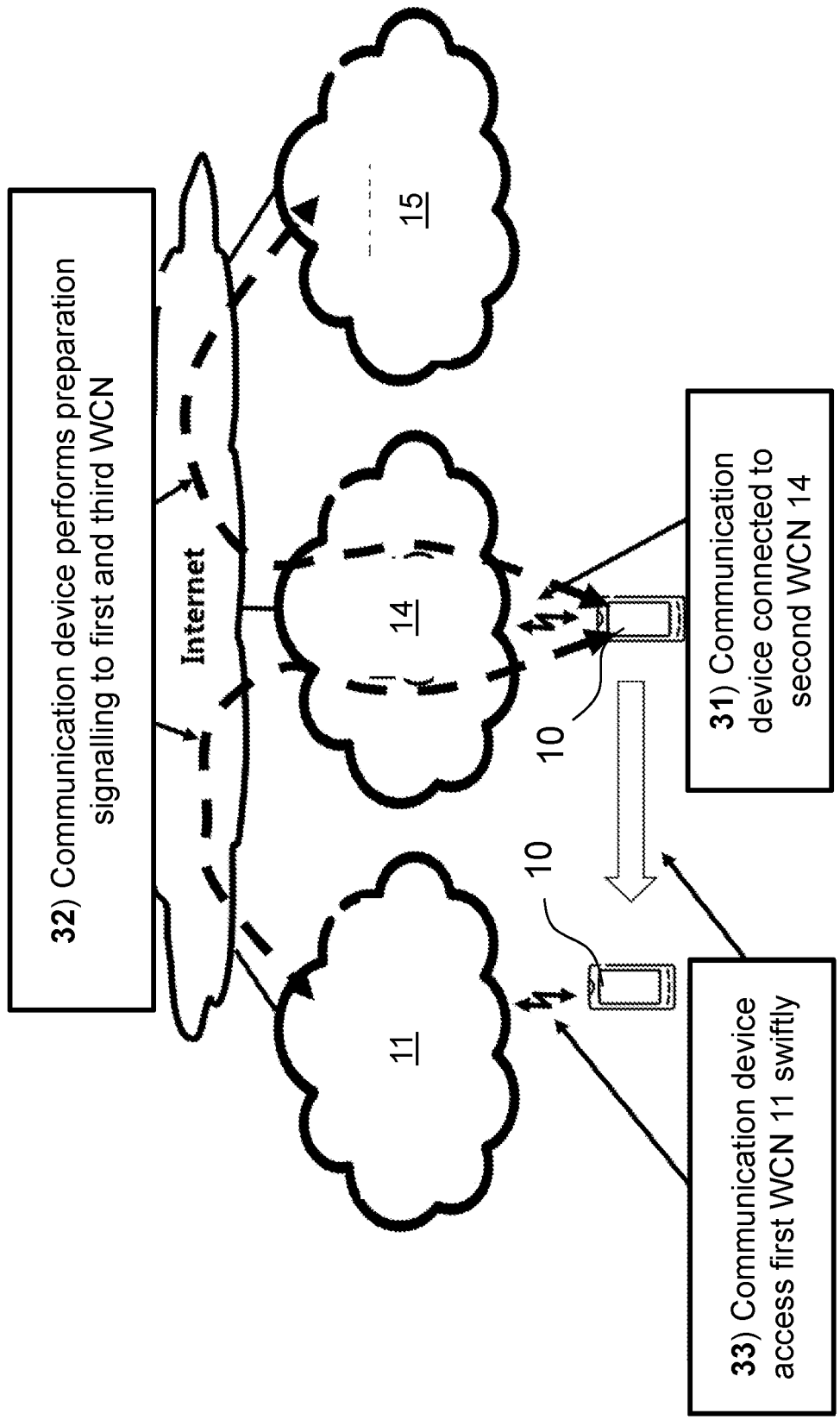
FIG. 3 is a schematic overview depicting a communication network according to embodiments herein.

FIG. 3 is a high level network architecture depicting the communication network when the communication device 10 moves, from the second wireless communication network (WCN) 14, to the first wireless communication network (WCN) 11.

Action 31. The communication device 10 is connected to the second WCN 14 provided by a second operator.

Action 32. According to embodiments herein the communication device 10 performs preparation signalling with one or more wireless communication networks such as the first wireless communication network 11 provided by a second operator and the third wireless communication network 15 provided by a third operator. The preparation signalling may be performed at different levels of preparation signaling towards the wireless communication networks. The preparation signalling may comprise pre-authentication of the communication device 10 in surrounding wireless communication networks by communication device signaling with surrounding wireless communication networks, thus preconfiguring a Subscriber Data Management function in the surrounding wireless communication networks. The preparation signalling may comprise a combined pre-authentication and pre-attach process, whereby the communication device signaling and subsequent signaling trigger preconfiguration of both the Subscriber Data Management function and a Mobility Management Function in surrounding wireless communication networks. The preparation signalling may comprise a combination of pre-authentication, pre-attach and pre-establishment of user plane connectivity, whereby the communication device signaling and subsequent signaling trigger preconfiguration of the Subscriber Data Management function, the Mobility Management Function, a Session Management Function and User Plane Functions in surrounding wireless communication networks.

The more preparatory steps are done in surrounding wireless communication networks, the less signaling has to occur at the time of actual mobility of the communication device 10, hence transfer time for the communication device 10 is minimized.

Action 33. The communication device 10 holds subscriptions for all 3 wireless communication networks, e.g. 3 different SIM profiles. The communication device 10 is capable to attach to the three wireless communication networks to improve network mobility performance for active and connected mode communication devices as well as for communication devices in idle mode i.e. to minimize the transition time while moving between different wireless communication networks.

Figure 4:
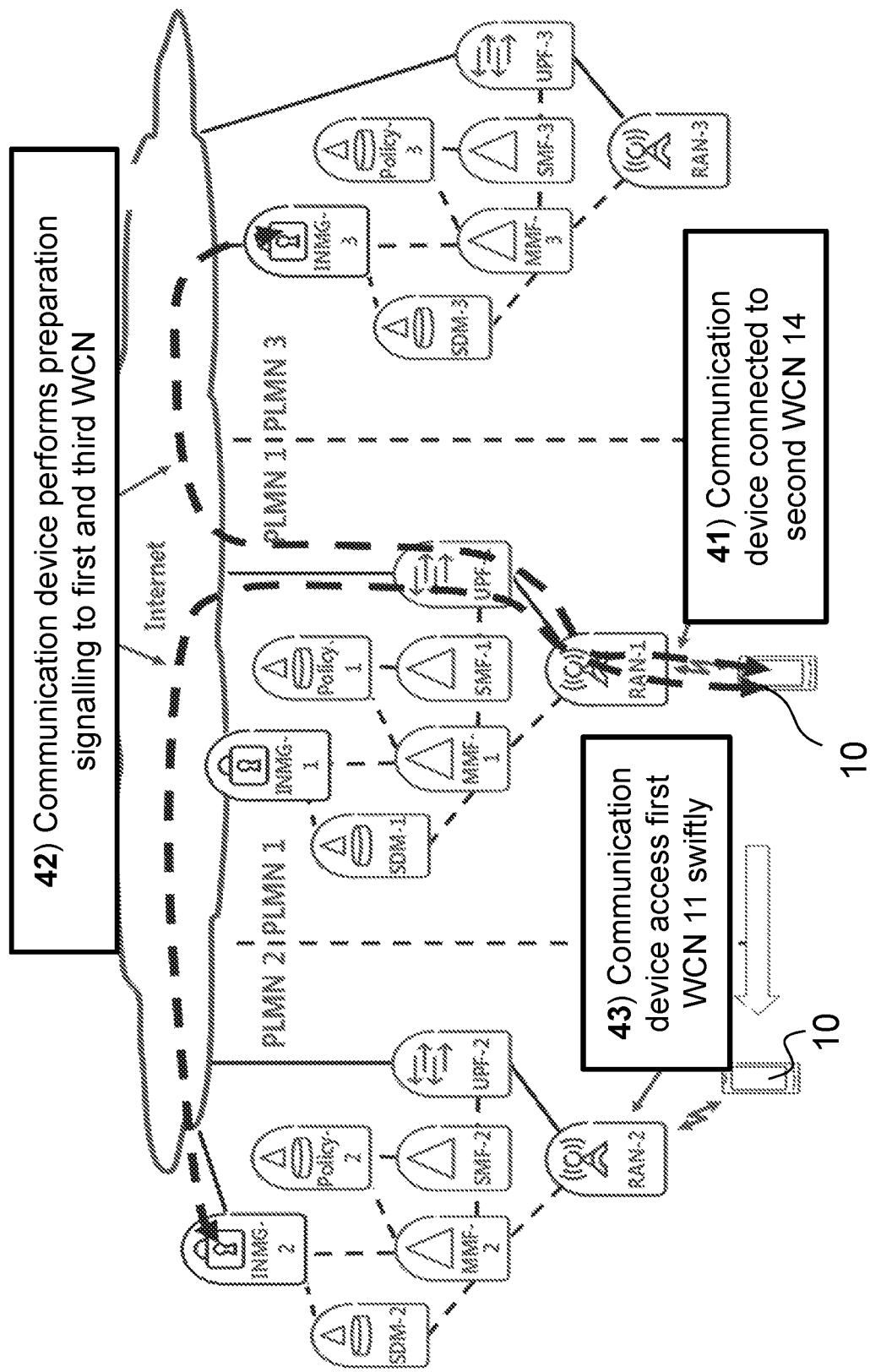
FIG. 4 is a schematic overview depicting a communication network according to embodiments herein.

FIG. 4 shows some embodiments when being implemented in the context of the ongoing 5G standardization in 3GPP. The same functionality is shown in each of the wireless communication networks and consists of the following. Radio Access Network (RAN) is shown as a single functional entity and it shall be understood that the RAN may be physically realized in different ways. RAN supports for example LTE Evolution and New Radio (NR) radio accesses. On the Core Network (CN) side, the functional entities contain Mobility Management Function (MMF), Session Management Function (SMF), Subscriber Data Management (SDM), Policy functionality and User Plane Function (UPF). These functions are all being currently standardized and are still subject to changes due to the ongoing standardization in SA2 working group in 3GPP. For example, the MMF may instead be called Access and Mobility Function (AMF). In addition, other functional entities may also exist in the 5G mobile network.

The communication device is connected to the second WCN 14 by the second operator, action 41. This means as normally that the communication device 10 is attached to the MMF-1, has been authenticated at least partly assisted by SDM-1 and has IP-connectivity to Internet via the UPF-1 configured at least partly with signaling between the communication device 10 and the SMF-1 function.

Each WCN also contains an Inter-Network Mobility Gateway (INMG) function. The INMG is a new function and term introduced herein. The communication device 10 can access the INMG function from e.g. the Internet, for example by the communication device 10 establishing an IPsec tunnel to INMG-2 in first WCN 11, and/or to the INMG-3 in third WCN 15, via the IP connectivity provided by the second WCN 14. The INMG in each WCN acts as a gateway between the different functions in the WCNs and the communication device 10.

In action 42, the communication device 10 performs different levels of preparation signaling towards the first WCN 11 and the third WCN 15 via the INMG functions in these WCNs. FIG. 4 shows that the communication device 10 communicates with the INMG function. Additional signaling is also performed towards the different WCN functions as described below.

In action 43, the communication device 10 performs an abbreviated access process improving network mobility performance for active and connected mode communication devices i.e. to minimize the transition time while moving between different WCNs.

Figure 5:
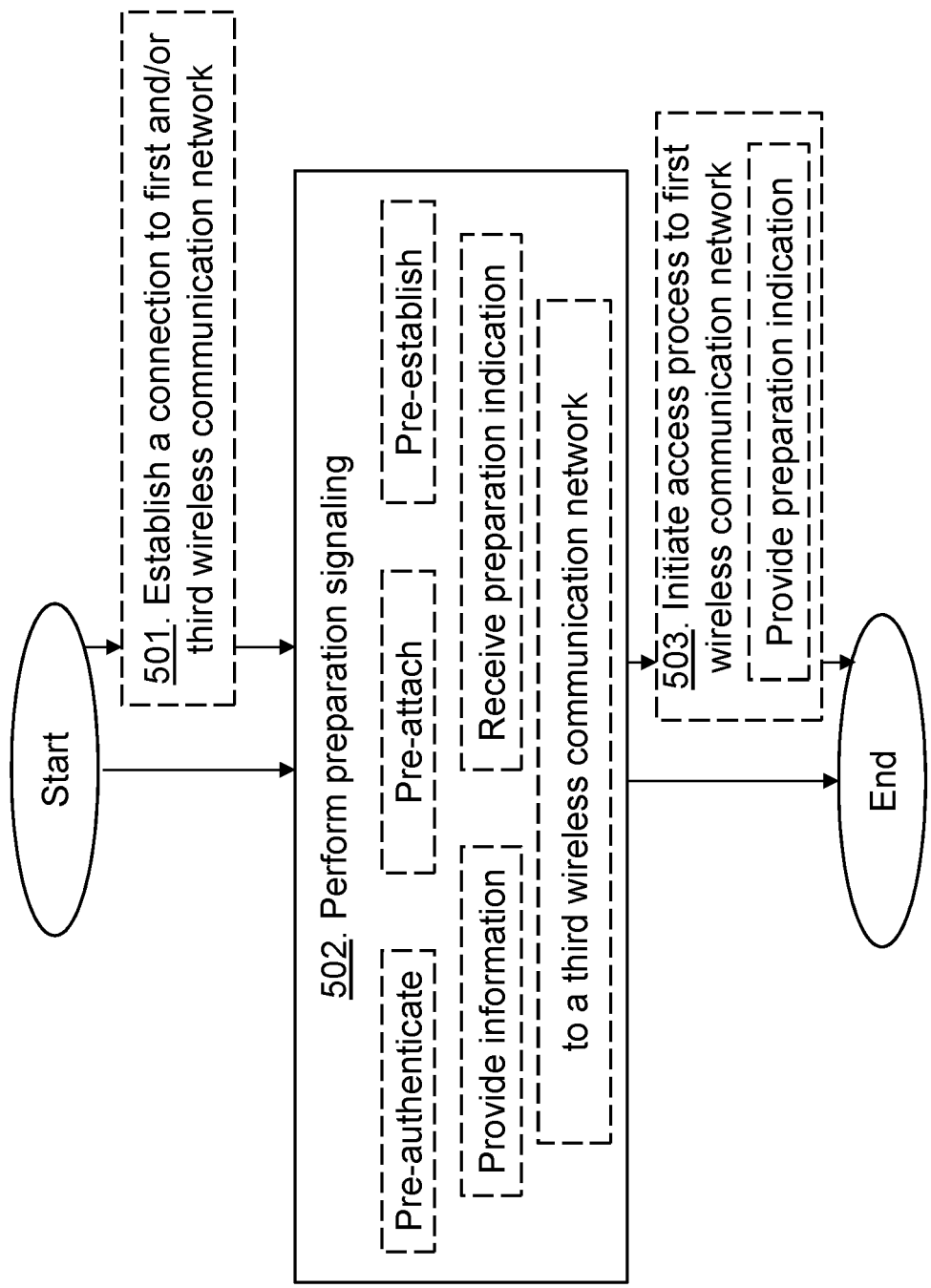
FIG. 5 is a flowchart depicting a method performed by a communication device according to embodiments herein.

The method actions performed by the communication device 10 for handling communication in the communication network comprising at least the first wireless communication network 11 and the second wireless communication network 14 according to some embodiments will now be described with reference to a flowchart depicted in FIG. 5. The communication device 10 is served by the radio network node 13 in the second wireless communication network 14. The actions do not have to be taken in the order stated below, but may be taken in any suitable order. Actions performed in some embodiments are marked with dashed boxes.

Action 501. The communication device 10 may establish a respective connection, e.g. a tunnel connection, transparently through the second wireless communication network, to the first wireless communication network and/or the third wireless communication network.

Action 502. The communication device 10 performs the preparation signaling, via the radio network node 13 and transparently through the second wireless communication network 14, to the first network node 12 of the first wireless communication network 11 for preparing the first network node 12 with a pre-configuration for serving the communication device 10.

The communication device 10 may perform the preparation signaling by providing information, to the first network node 12, for creating context associated with the communication device.

The communication device 10 may perform the preparation signaling by pre-authenticating the communication device 10 to the first wireless communication network, see FIGS. 8-9 below.

The communication device 10 may perform the preparation signaling by pre-attaching the communication device to the first wireless communication network, see FIGS. 11-12 below.

The communication device 10 may perform the preparation signaling by pre-establishing a user plane connectivity for the communication device in the first wireless communication network, see FIGS. 14-15 below. It should be noted that the connectivity is not yet established at this point, only a "prepared context" is stored at the first wireless communication network 11. The "context" is all data to have a common communication device-network configuration. The preparation signalling may include a check of capability to perform the service, and/or may be extended with resource reservation.

The communication device 10 may perform the preparation signaling by receiving, from the first network node 12, a preparation indication referencing the pre-configuration e.g. pointing to a prepared context of the communication device 10. This preparation indication may be stored for a time interval.

Action 503. The communication device 10 may then initiate an access process to the first wireless communication network, which access process comprises an abbreviated signaling procedure referencing the prepared pre-configuration for serving the communication device. The abbreviated signaling procedure may comprise providing the preparation indication to the first wireless communication network, see actions 94, 125, and 156 below.

The communication network may further comprise the third wireless communication network and the communication device 10 may perform preparation signaling, via the radio network node 13 and transparently through the second wireless communication network, to the third network node 16 of the third wireless communication network for preparing the third network node 16 with the pre-configuration for serving the communication device 10. Thus, it should be noted that the communication device 10 may perform preparation signaling to one or more wireless communication networks.

Figure 6A:
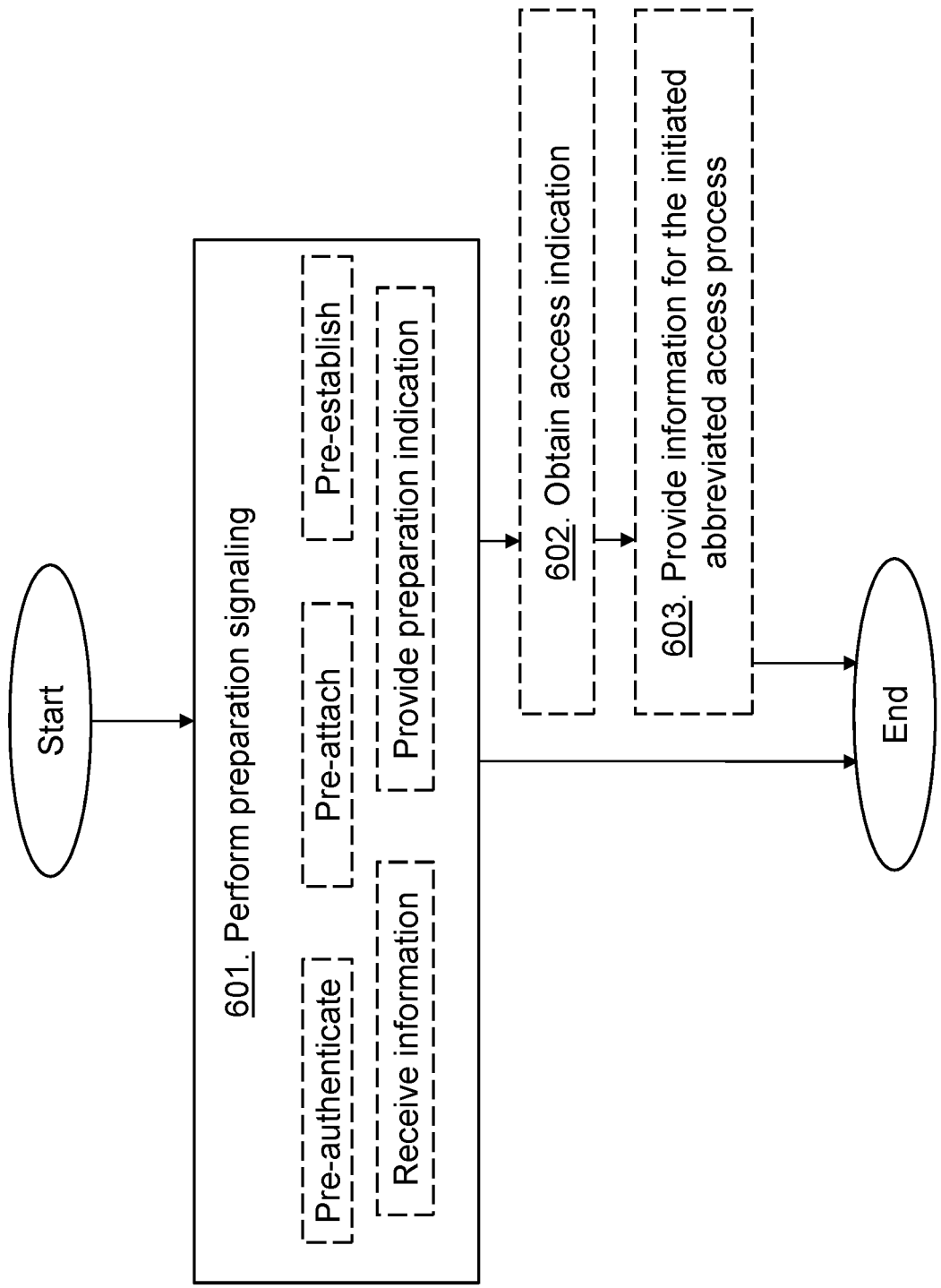
FIG. 6a is a flowchart depicting a method performed by a first network node according to embodiments herein.

The method actions performed by the first network node 12 for handling communication of the communication device 10 in the communication network comprising at least the first wireless communication network 11 and the second wireless communication network 14 according to some embodiments will now be described with reference to a flowchart depicted in FIG. 6*a*. The first network node 12 is comprised in the first wireless communication network 11 and the communication device is served by the radio network node 13 comprised in the second wireless communication 12. Actions performed in some embodiments are marked with dashed boxes.

Action 601. The first network node 12 performs the preparation signaling with the communication device 10, via the radio network node 13 and transparently through the second wireless communication network, for preparing the first network node 12 with the pre-configuration for serving the communication device 10.

The first network node 12 may perform the preparation signaling by creating, context associated with the communication device based on received information from the communication device, and storing said context.

Figure 8:
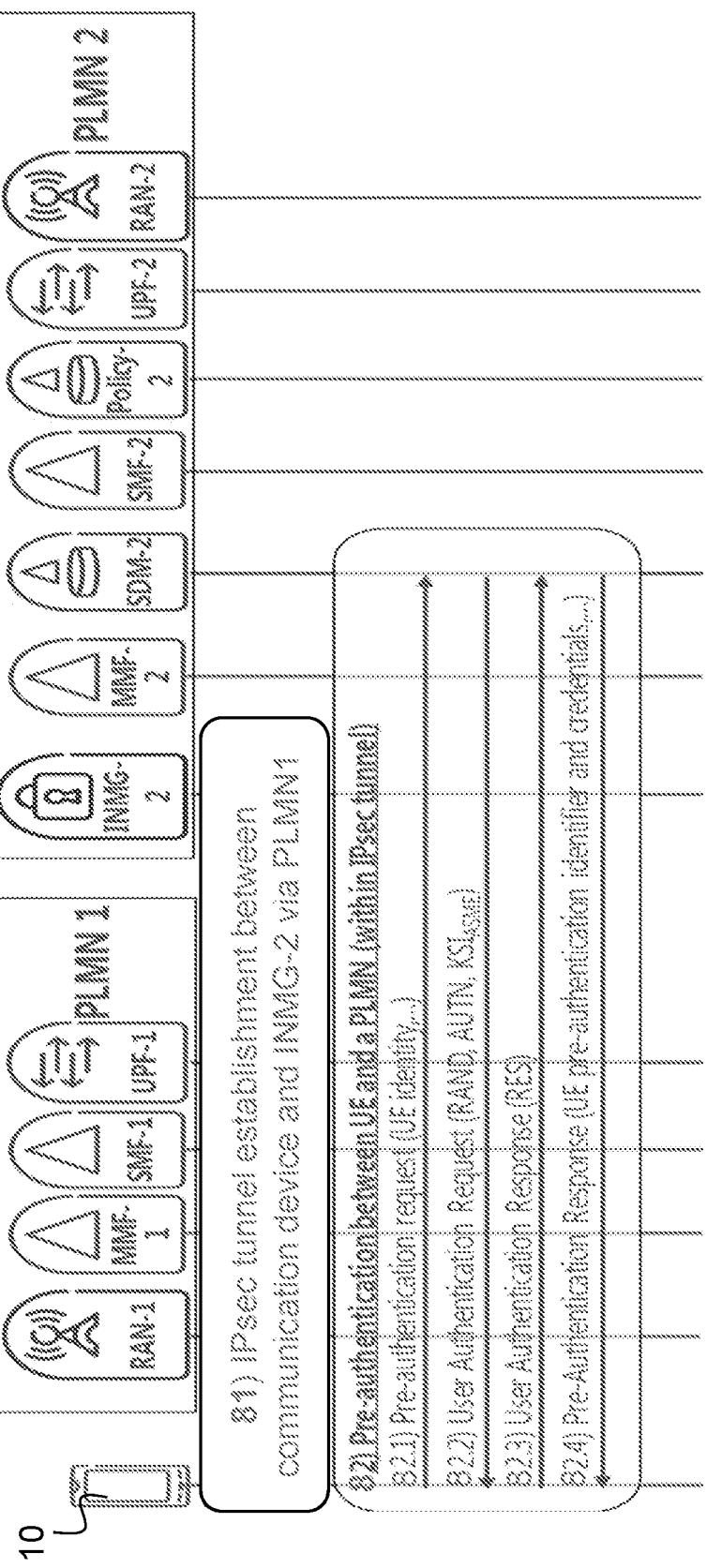
FIG. 8 shows a schematic signalling scheme for pre-authentication between a communication device and target wireless communication networks.

The first network node 12 may perform the preparation signaling by pre-authenticating the communication device to the first wireless communication network, see FIG. 8.

Figure 11:
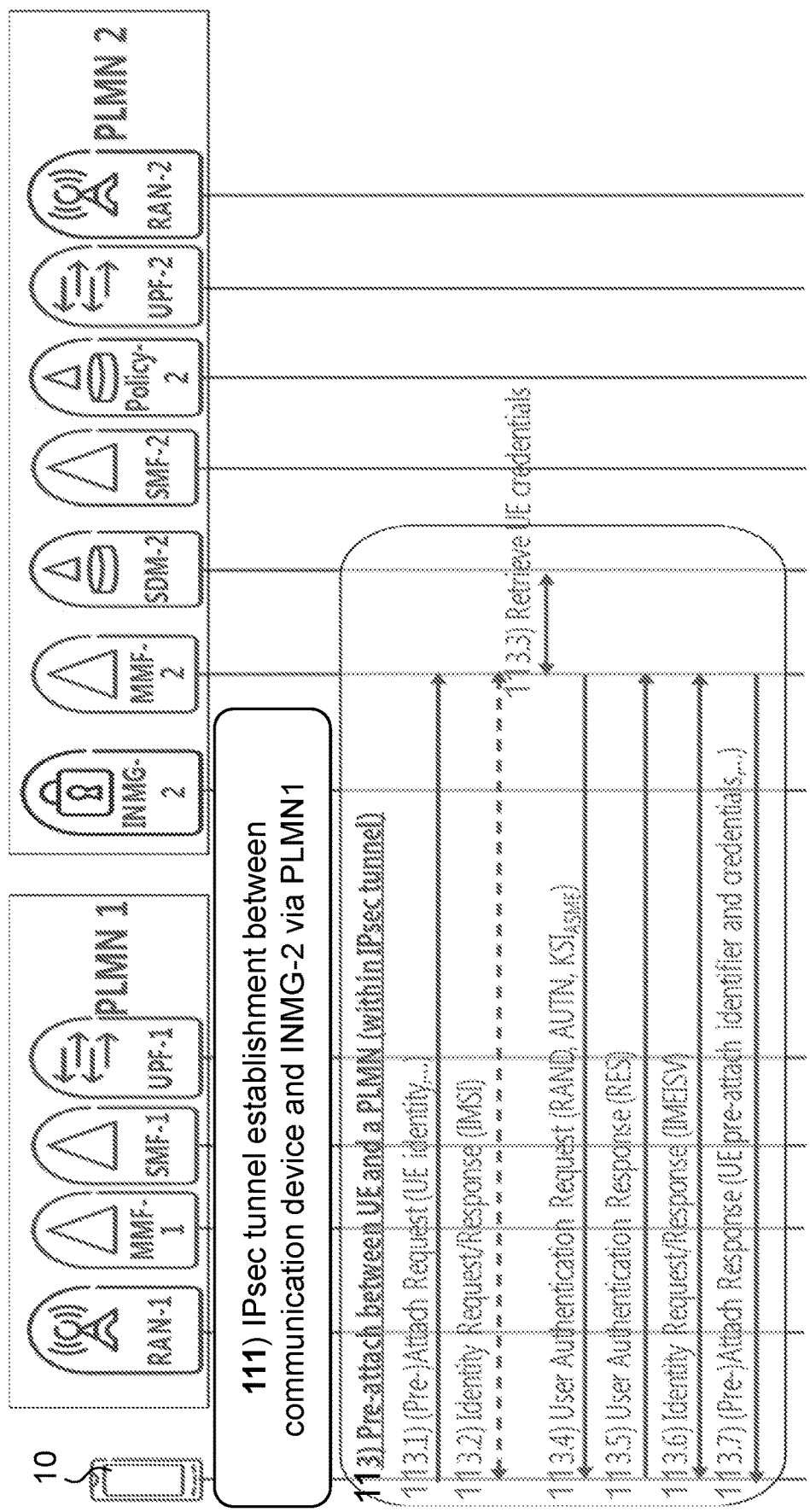
FIG. 11 shows a schematic signalling scheme for performing pre-attach between a communication device and target wireless communication networks.

The first network node 12 may perform the preparation signaling by pre-attaching the communication device to the first wireless communication network, see FIG. 11.

Figure 14:
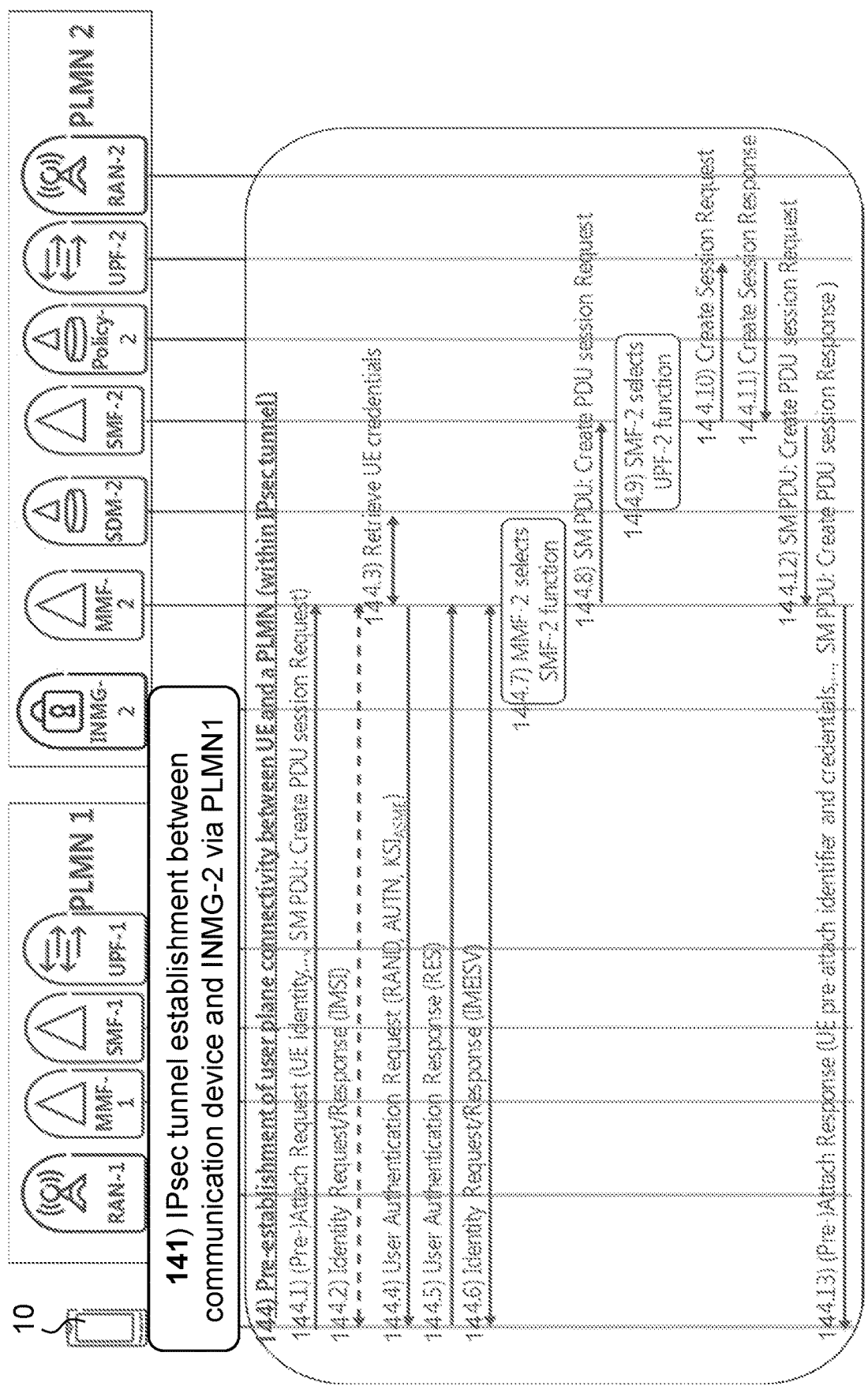
FIG. 14 shows a schematic signalling scheme for pre-establishment of user plane connectivity between a communication device and target wireless communication networks.

The first network node 12 may perform the preparation signaling by pre-establishing a user plane connectivity for the communication device 10 in the first wireless communication network, see FIG. 14. The first network node 12 may create and/or fetch context for the communication device 10.

The first network node 12 may perform the preparation signaling by providing, to the communication device 10, the preparation indication referencing the pre-configuration, see actions 82.4, 113.7 and 144.13.

Action 602. The first network node 12 may then obtain an access indication indicating the initiated abbreviated access process of the communication device 10 to the first wireless communication network 11, which access indication is referencing the prepared pre-configuration for serving the communication device. For example, the first network node 12 may obtain the access indication by receiving the preparation indication referencing the pre-configuration. The access indication may be received from the communication device 10 via the first access point 18 in case the first network node is an MME, see actions 126 and 157, or received from an MME in case the first network node is an HSS, see action 96.

Action 603. The first network node 12 may then provide information related to the pre-configuration for the communication device for the initiated abbreviated access process. The information is provided within the first network node, e.g. in case the network node is a MME, see action or to another network node such as an MME in case the first network node is an HSS or SDM function, see action 98.

Figure 6B:
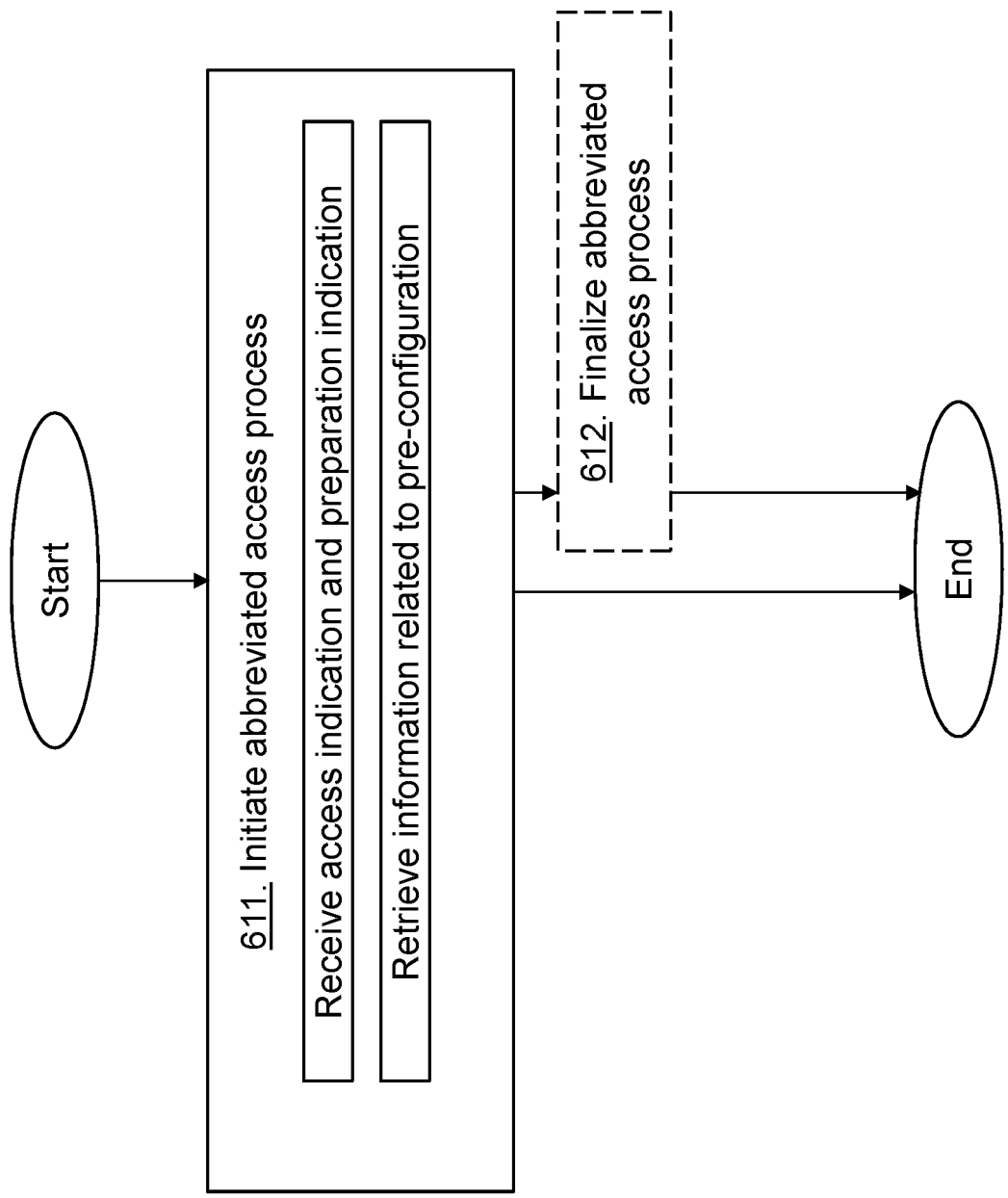
FIG. 6b is a flowchart depicting a method performed by a network node according to embodiments herein.

The method actions performed by a network node, such as the other network node 17 or the first network node 12, for handling communication of the communication device 10 in the communication network comprising at least the first wireless communication network 11 and the second wireless communication network 14 according to some embodiments will now be described with reference to a flowchart depicted in FIG. 6b. The network node is comprised in the first wireless communication network 11 and the communication device 10 is served by the radio network node 13 comprised in the second wireless communication 12. The actions do not have to be taken in the order stated below, but may be taken in any suitable order. Actions performed in some embodiments are marked with dashed boxes.

Action 611. The network node initiates, or actually continues the abbreviated access process initiated by communication device 10, the abbreviated access process, for the communication device 10, to the first wireless communication network 11, which abbreviated access process comprises: receiving, from the communication device 10, the access indication indicating the abbreviated access process, and the preparation indication referencing the pre-configuration for serving the communication device 10. The pre-configuration is configured from the preparation signaling from the communication device in the second wireless communication network. The abbreviated access process further comprises retrieving information related to the pre-configuration for serving the communication device for the initiated abbreviated access process using the preparation indication. The network node may retrieve the information from another network node such as a HSS or SDM or the same network node. The network node may e.g. be a MME communicating with another network node such as an HSS during embodiments herein relating to pre-authenticating the communication device 10 in the first wireless communication network 11.

Action 612. The network node may finalize the abbreviated access process using the retrieved information.

As described above, the different solutions can be divided into different levels of preparation (i.e. how much the move to a target WCN is prepared in advance) and how the actual access is optimized depending on the level of preparation performed in advance. These preparation signaling actions minimize the time needed to switch between wireless communication networks.

Figure 15:
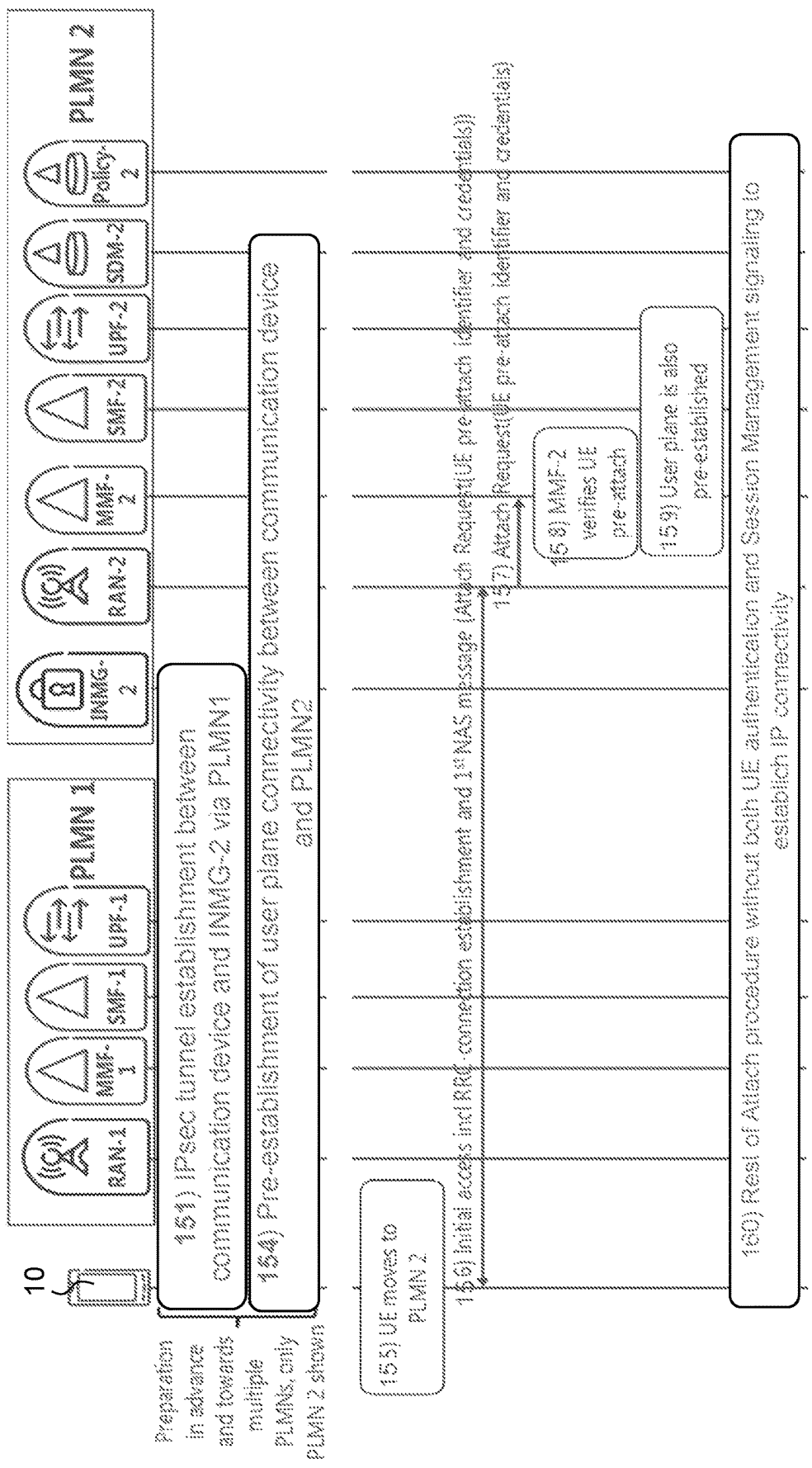
FIG. 15 shows a schematic signalling scheme to access a wireless communication network after pre-establishment of user plane connectivity.
Figure 16:
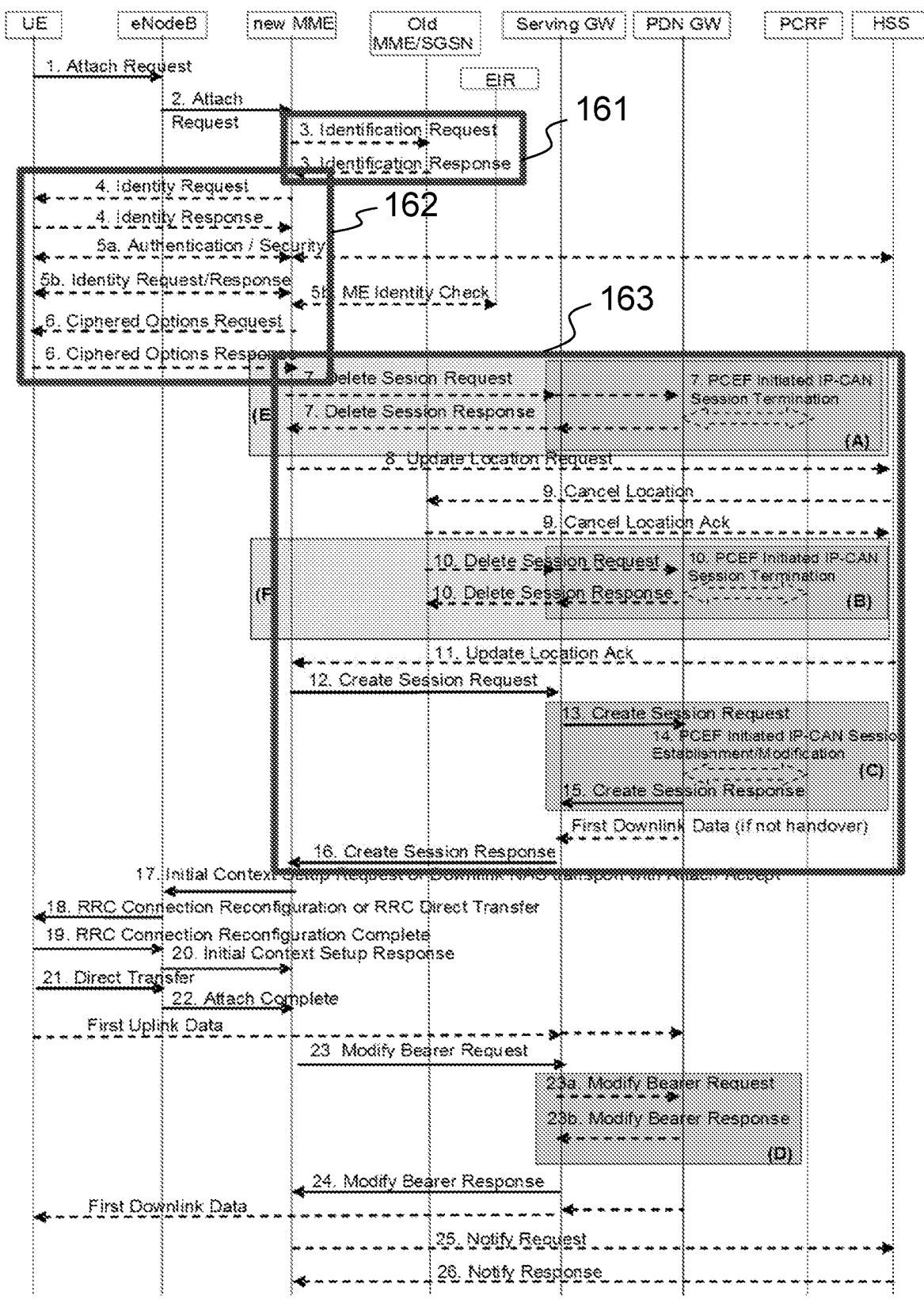
FIG. 16 shows impact on the LTE/EPC attach procedure to access a wireless communication network after pre-establishment of user plane connectivity.

The alternative solutions are as following and are described in the following sub-sections. The optimizations achieved also increase in the order the solutions are described i.e. Pre-authentication provides initial improvements that are further improved with Pre-attach and finally Pre-establishment of user plane connectivity provides the most optimal improvements as all parts of the core network in the target PLMN are prepared:

Pre-authentication (described in FIGS. 8-10)
Pre-attach (described in FIGS. 11-13)
Pre-establishment of user plane connectivity (described in FIGS. 14-16)

Figure 7:
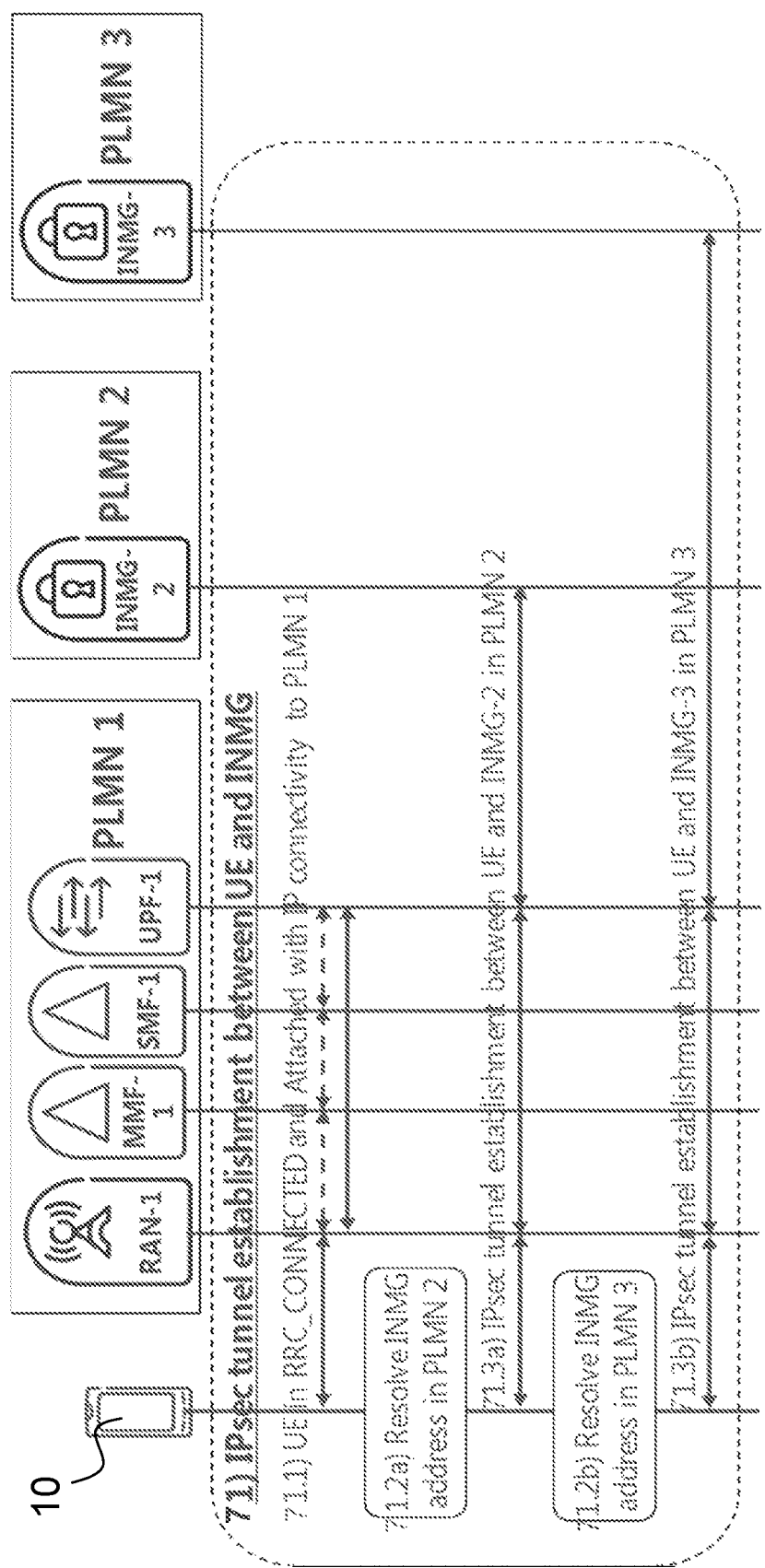
FIG. 7 shows a schematic signalling scheme for establishment of connectivity between a communication device and INMG functions.

In addition, FIG. 7 describes the common part needed for all the above solutions i.e. how the communication device 10 establishes connectivity to the INMG function in the different networks, see action 501 above.

The INMG function is connected towards control plane nodes in the WCNs, compared to user plane nodes and authentication servers in the ePDG case, and the INMG provides improved mobility between different 3GPP networks, compared to mobility between 3GPP and non-3GPP networks in the ePDG case. FIG. 7 shows the main principles for how the communication device 10 establishes connectivity to the INMG functions in different WCNs, i.e. the communication device 10 performs an IPsec tunnel establishment. Also in this example the communication device 10 is in active and connected mode in the second WCN 14 denoted as PLMN1 (action 71.1: UE in RRC_connected and attached with IP connectivity) and has the possibility to establish connectivity to the INMG functions in the first WCN 11 denoted as PLMN2 and the third WCN 15 denoted as PLMN3.

In Action 71.2a and Action 71.2b the communication device 10 resolves the addresses to the INMG-2 and INMG-3 functions in PLMN 2 and PLMN 3. There are different variants for how these steps can be performed. The communication device 10 may be preconfigured with Fully Qualified Domain Names (FQDN) of the different INMG functions and then the INMG IP addresses can be retrieved using normal Domain Name Server (DNS) queries. In another alternative, the communication device 10 builds the INMG FQDN based on known logic identifying the different WCNs, one example of this is to build the FQDN based on the Mobile Country Code (MCC) and Mobile Network Code (MNC) of the PLMN-ID of these WCNs. One example of this case is an INMG FQDN in the format of:

inmg.mnc015.mcc234.pub.3gppnetwork.org (for a PLMN-ID with MCC=015 and MCC=234).

In Action 71.3*a* and Action 71.3*b* the communication device 10 performs IPsec tunnel establishment. The IPsec tunnel establishment may also contain authentication of the establishment based on any access credential the communication device 10 has towards a specific WCN, for example based on (U)SIM or any other credentials. The IPsec tunnel can be established in either tunnel mode or in transparent mode.

Once the communication device 10 has established connectivity to the INMG functions, then the communication device 10 may perform any of the preparation signaling described herein. Usage of IPsec is to provide secure communication between the communication device 10 and the INMG function, but the communication can be secured using any existing or future solution and protocols providing secure communication, e.g. Transport Layer Security (TLS)/Transport Control Protocol (TCP) or Quick User Datagram Protocol (UDP) Internet Connections (QUIC).

FIG. 8 shows one example of pre-authentication between the communication device 10 and a SDM-2 function in the first WCN 11 denoted as PLMN 2. The basic principle is that Authentication related signaling can be performed as part of the Pre-Authentication. FIG. 8 only shows the pre-authentication towards the PLMN 2 but it shall however be understood that similar pre-authentication can take place in parallel towards the third WCN 15 shown e.g. in FIG. 3, and towards any other WCNs as well.

Pre-authentication is based on that secure communication, for example based on IPsec tunnel, has been established between the communication device 10 and the INMG-2 function shown as action 81 in FIG. 8 or the method in FIG. 7.

The communication after this depends on the IPsec mode being used. In IPsec tunnel mode the communication device 10 needs to also retrieve the address of the SDM-2 function and then perform communication towards this SDM-2 function using the established IPsec tunnel. The SDM-2 address can also be based on either preconfiguration in the communication device 10 or that the communication device 10 dynamically builds the FQDN for the SDM-2 function.

In IPsec transparent mode, the communication device 10 signals towards the INMG function that is then capable to select a SMF function and forward the signaling between the communication device 10 and this SDM function, i.e. in this case the communication device 10 doesn't address the SDM function. The INMG logic to select a specific function in the operator's network can be depending on for example detection of application protocol and signaling messages from the communication device 10 and then forwarding these to the function handling that specific logic, for example that it is known by the INMG that any pre-authentication is handled by an SDM function. In another alternative the SDM-2 and INMG-2 are implemented in the same physical node.

FIG. 8 also shows how the communication device 10 in action 82 may perform Pre-authentication towards the SDM-2 function in PLMN 2. In action 82.1 the communication device 10 sends a Pre-authentication request message to the SDM-2 function. This message includes a communication device identity, for example International Mobile Subscriber Identity (IMSI) for (U)SIM based authentication that is shown in FIG. 8. In action 82.2 the SDM-2 triggers authentication of the communication device 10 in a similar way as in existing LTE/EPC networks by sending a User Authentication Request including Random number (RAND), Authentication Token (AUTN) and Key Selection Identifier ($KSI_{ASME}$) parameters. The communication device 10 responds with a User Authentication Response including the Result (RES) parameter (action 82.3). After this the SDM-2 has authenticated the communication device 10, and the communication device 10 has authenticated the SDM-2 function. Then SDM-2 stores a local context for this communication device 10 and creates a related UE pre-authentication identifier and possibly other credentials, which is an example of the preparation indication. The SDM-2 then returns a Pre-Authentication Response message to the communication device 10 including the UE pre-authentication identifier and possibly other credentials (action 82.4). The communication device 10 stores the received information such as the UE pre-authentication identifier and possibly other credentials in case it would later decide to access the PLMN 2 i.e. the first WCN 11.

The connection between the SDM-2 and the communication device 10 may be maintained and the SDM-2 may trigger the Authentication procedure again, for example with some periodicity.

Figure 9:
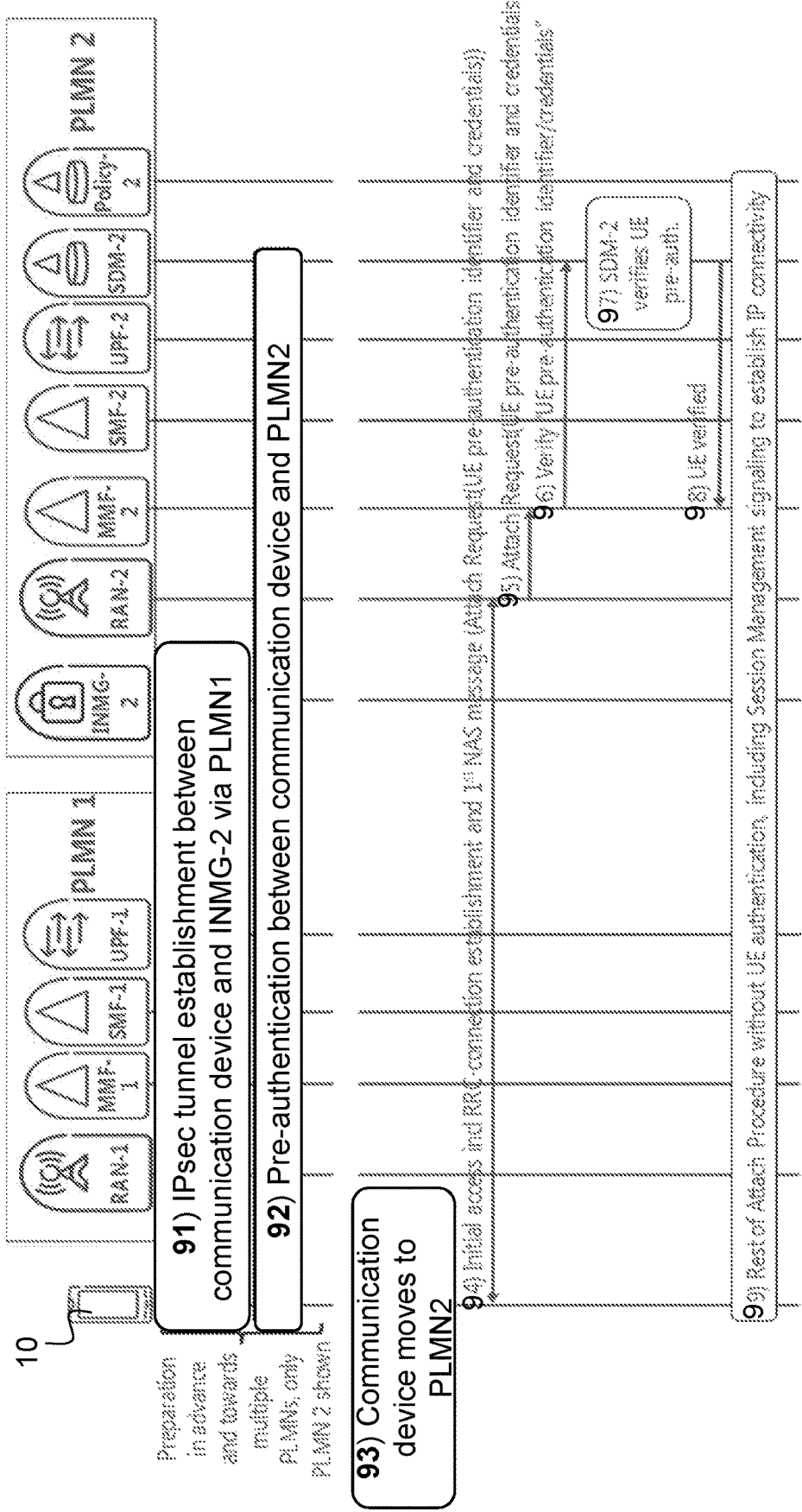
FIG. 9 shows a schematic signalling scheme to access a wireless communication network after a pre-authentication.

FIG. 9 shows what happens when the communication device 10 decides to leave PLMN1 (action 93) and move to PLMN2 in the case when Pre-authentication has been performed in advance between the communication device 10 and the SDM-2 function in PLMN 2 (action 92; see FIG. 8) after IPsec tunnel has been established between the communication device 10 and the INMG-2 function shown as action 91 or the method in FIG. 7. The main parts are that the communication device 10 includes the preparation indication referencing the pre-configuration such as the UE pre-authentication identifier and possibly other credentials received during Pre-authentication in the Attach Request message sent to the MMF-2 function (action 94 and action 95). The MMF-2 function uses the received UE pre-authentication identifier and possibly other credentials information to select the correct SDM-2 that holds the pre-authenticated UE context and then asks the SDM-2 to verify that Pre-authentication has been correctly performed in advance (action 96). The SDM-2 does the verification (action 97) and in this example the verification is successful and the SDM-2 returns an indication of this to the MMF-2 (including the needed security keys and credentials) (action 98). The MMF-2 then continues the Attach procedure with the exception that no Authentication needs to be performed during Attach (action 99). This speeds up the overall Attach procedure and the communication device 10 gains IP connectivity faster compared to the case when Authentication would need to be performed first when the communication device 10 connects to PLMN 2.

Figure 10:
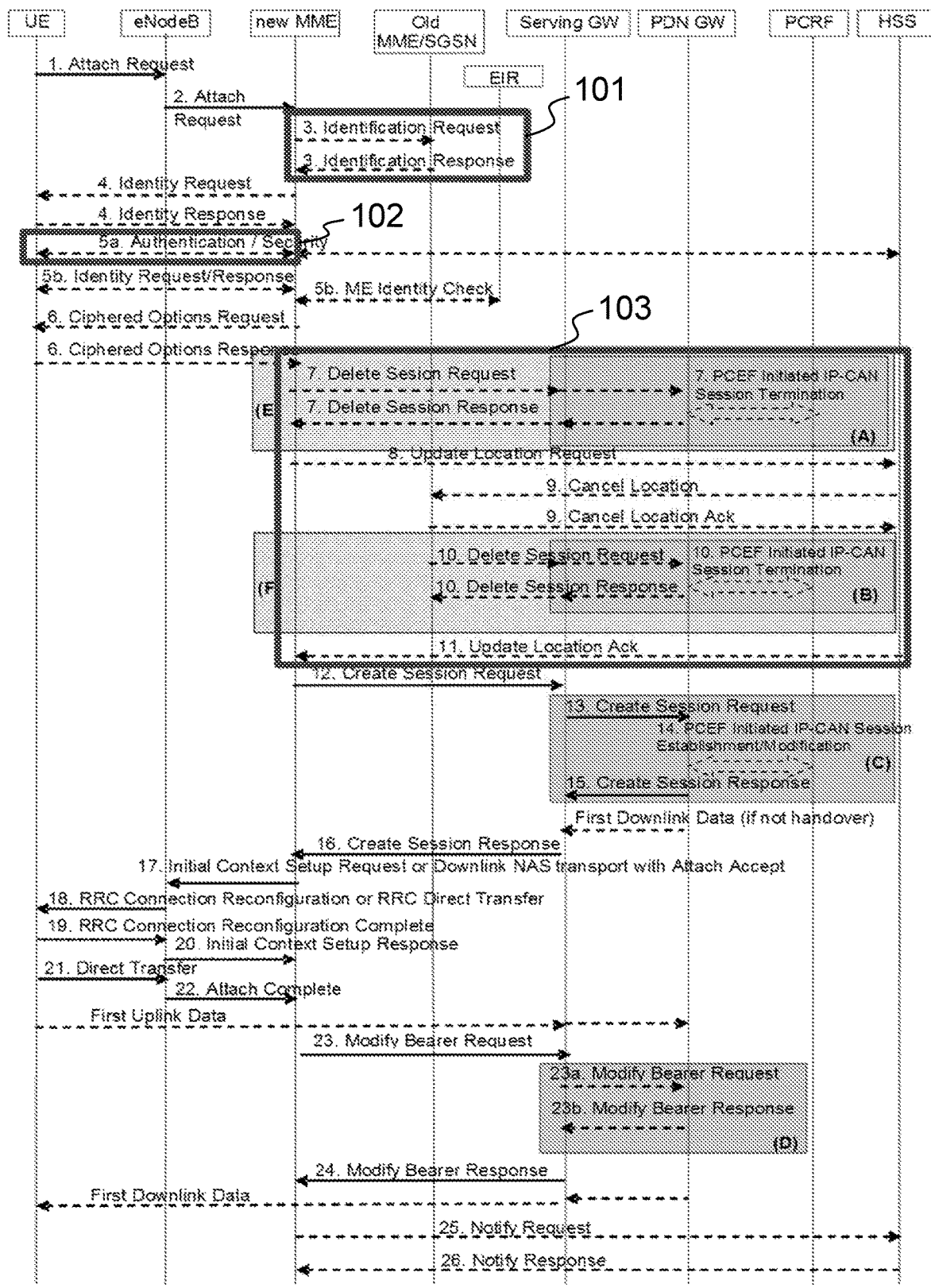
FIG. 10 shows impact on the LTE/EPC attach procedure to access a wireless communication network after a pre-authentication.

FIG. 10 shows the impact on LTE/EPC Attach procedure for the case when Pre-authentication has been performed in advance. The Attach procedure in 5G context is not yet agreed on and therefore the impact is instead shown in relation to the already standardized LTE/EPC Attach procedure (FIG. 5.3.2.1-1 in 3GPP TS 23.401 v.14.0.0).

The parts that don't need to be performed are highlighted with solid boxes in FIG. 10. The skipping of these parts based on the pre-authentication reduces the time needed to switch between wireless communication networks. The first step that can be skipped is box 101. This is based on both that the communication device 10 indicates the preparation indication such as UE pre-authentication identifier and possibly other credentials information as part of the Attach Request and that the communication device 10 doesn't include any Globally Unique Temporary ID (GUTI), indicating another MME, in this message. The second part that can be partly skipped is box 102 ("Authentication/Security")

and in this case it is the part about Authentication of the communication device 10 between MME and the communication device 10 that can be skipped. The signaling between MME and HSS (i.e. SDM in 5G context) is also modified as it is now about asking the HSS to verify that the communication device 10 has been correctly Pre-authenticated. Actions in box 103 can also be skipped as this is an initial Attach to the MME and there are no previous bearers established for this communication device 10, and as the HSS already knows that the communication device 10 is now attached to the MME (based on the verification of the UE Pre-authentication).

The pre-attach solution consists of combined pre-authentication and pre-attach, whereby the communication device signaling and subsequent signaling trigger preconfiguration of both the Subscriber Data Management function and the Mobility Management Function in surrounding wireless communication networks. This solution replaces the Pre-authentication solution described above as the pre-authentication part is performed in a different way.

FIG. 11 shows one example of pre-attach between the communication device 10 and a MMF-2 function, also referred to as network node, in the first wireless communication network denoted PLMN 2. The basic principle is that all Non-Access Stratum (NAS) Mobility Management (MM) signaling (incl. Authentication) can be performed as part of the Pre-Attach. FIG. 11 only shows the pre-attach towards PLMN 2 but it shall however be understood that similar pre-attach can take place in parallel towards the third WCN 15 denoted PLMN 3 shown e.g. in FIG. 10 (and towards any other networks as well).

Pre-attach is based on that secure communication, for example based on IPsec tunnel, has been established between the communication device 10 and the INMG-2 function as described in FIG. 7 (shown as action 111 in FIG. 11). The communication after this depends on the IPsec mode being used and the description given above for communication between the communication device 10 and SDM-2 also applies for the communication between the communication device 10 and the MMF-2 function. The MMF-2 selection must also take into account the current position of the communication device 10 to ensure that a MMF serving the current area of the communication device 10 is selected in a specific PLMN.

FIG. 11 shows how the communication device 10 in action 113 performs Pre-attach towards the MMF-2 function in PLMN 2. In action 113.1 the communication device 10 sends a Pre-Attach request message to the MMF-2 function. The Pre-Attach request message may include a UE identity, for example IMSI for (U)SIM based authentication that is shown in FIG. 11. In action 113.2 the MMF-2 may trigger the Identity Request/Response procedure if additional information is needed from the communication device 10. In action 113.3 the MMF-2 retrieves UE credentials to be used for authentication and security. In action 113.4 the MMF-2 triggers authentication of the communication device 10 in a similar way as in existing LTE/EPC networks by sending a User Authentication Request including RAND, AUTN and $KSI_{ASME}$ parameters. The communication device 10 responds with a User Authentication Response including the RES parameter (action 113.5). After this the MMF-2 has authenticated the communication device 10, and the communication device 10 has authenticated the MMF-2 function. In action 113.6 the MMF-2 may retrieve the International Mobile Equipment Identity and Software Version (IMEISV) identity from the communication device 10. After this also additional procedures related to Attach between communication device 10 and MMF-2 may be performed (not shown in FIG. 11). The MMF-2 stores a local UE context for this communication device 10 and creates a related UE pre-attach identifier and possibly other credentials. The UE pre-attach identifier can for example be a Globally Unique Temporary Identifier (GUTI). The MMF-2 then returns a Pre-Attach Response message to the communication device 10 including the preparation indication such as the UE pre-attach identifier and possibly other credentials (action 113.7). The communication device 10 stores the received information such as the preparation indication in case it would later decide to access the PLMN2 network.

The connection between the MMF-2 and the communication device 10 may be maintained and the MMF-2 may trigger for example the Authentication procedure again and for example with some periodicity.

Figure 12:
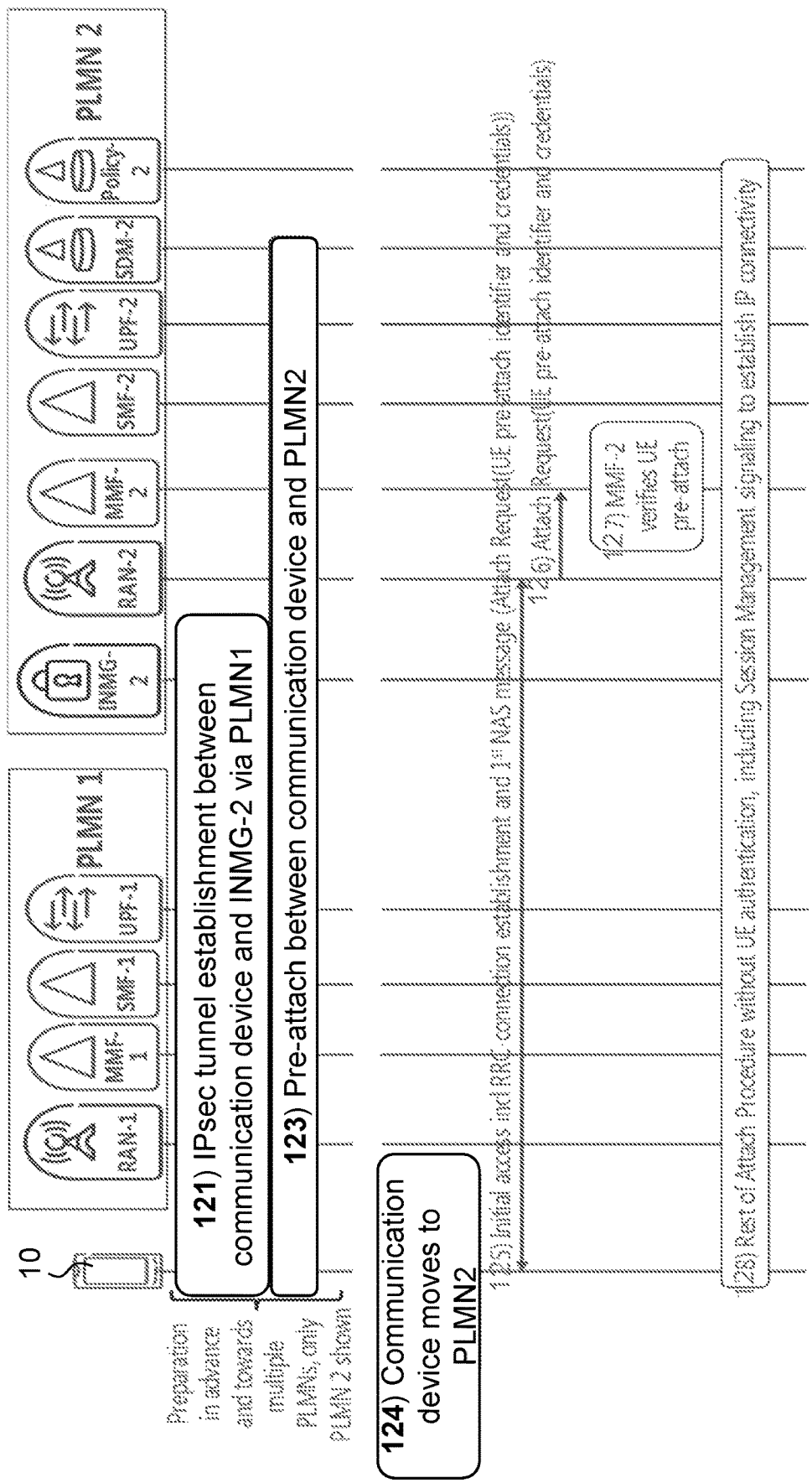
FIG. 12 shows a schematic signalling scheme to access a wireless communication network after performing the pre-attach.

FIG. 12 shows what happens when the communication device 10 decides to leave PLMN 1 and to move to PLMN 2 (action 124) in the case when Pre-attach has been performed in advance between the communication device 10 and the MMF-2 function in PLMN 2 (action 123; see FIG. 11). The main parts are that the communication device 10 includes the preparation indication such as the UE pre-attach identifier and possibly other credentials received during Pre-attach in the Attach Request message sent to the MMF-2 function (action 125 and action 126). The communication device 10 also includes parts of the UE pre-attach identifier in the signaling towards RAN to ensure that the RAN selects the correct MMF function where the pre-attached UE context exists (for example if GUTI was used as UE pre-attach identifier then S-TMSI part of the GUTI is signaled from the communication device 10 to the RAN). The MMF-2 function uses the received UE pre-authentication identifier and possibly other credentials information to verify the relation between this Attach Request and a stored Pre-Attached UE context (action 127). In this example the verification is successful and the MMF-2 may return an indication such as Attach Accept to the communication device 10 either directly (not shown in FIG. 12) or as part of continuation of the Attach procedure (action 128). The MMF-2 then continues the Attach procedure with the exception that no Authentication or Attach related procedures need to be performed (action 128). This speeds up the overall Attach procedure and the communication device 10 gains IP connectivity faster compared to the case when Authentication and other Attach related procedures would need to be performed first when the communication device 10 connects to PLMN 2.

Figure 13:
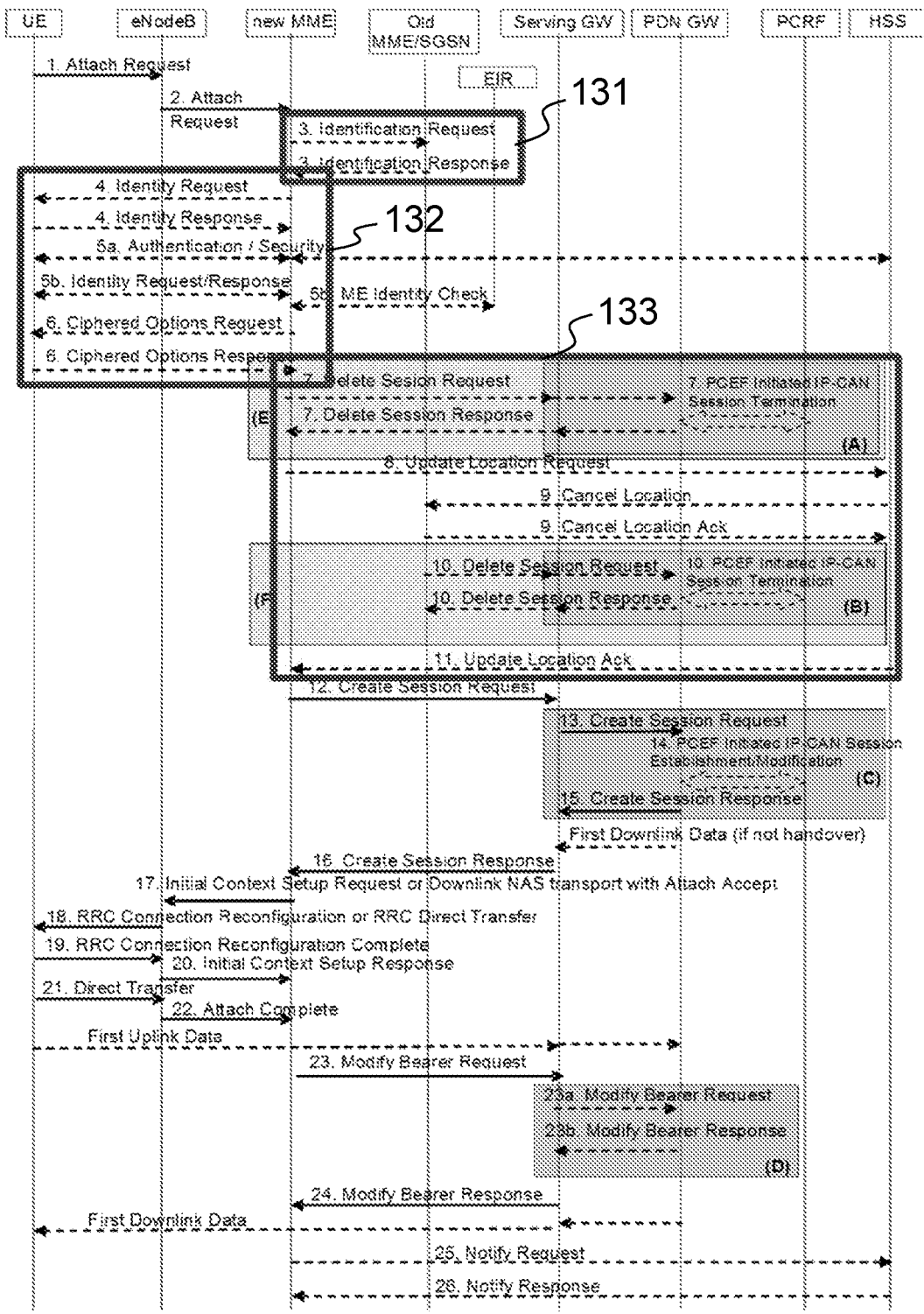
FIG. 13 shows impact on the LTE/EPC attach procedure to access a wireless communication network after performing the pre-attach.

FIG. 13 shows the impact on LTE/EPC Attach procedure for the case when Pre-attach has been performed in advance. The Attach procedure in 5G context is shown in relation to the already standardized LTE/EPC Attach procedure (FIG. 5.3.2.1-1 in 3GPP TS 23.401 v.14.0.0).

The parts that don't need to be performed are highlighted with solid boxes in FIG. 13. The same parts as shown in FIG. 10 can be skipped, see box 131 and box 133, and in addition, all Attach related steps such as step 4, 5a, 5b and 6 can be skipped; see box 132. FIG. 13 shows that even more steps can be skipped when comparing Pre-attach towards Pre-authentication and therefore the access to a wireless communication network is further optimized as it takes shorter time.

The Pre-establishment of user plane connectivity solution consists of combined pre-attach and pre-establishment of user plane connectivity whereby the preparation signaling and subsequent signaling trigger preconfiguration of the Subscriber Data Management function, the Mobility Management Function, Session Management Function and Use Plane Functions in surrounding wireless communication networks. This may replace the Pre-authentication solution and the Pre-attach solution described herein.

FIG. 14 shows one example of Pre-establishment of user plane connectivity between the communication device 10 and the network node such as MMF-2, SMF-2 and UPF-2 functions in PLMN 2. The basic principle is that all Non Access Stratum (NAS) Mobility Management (MM) signaling, incl. Authentication, and all NAS Session Management (SM) signaling can be performed as part of the Pre-establishment of user plane connectivity. FIG. 12 only shows the pre-attach towards PLMN 2 but it shall however be understood that similar pre-attach can take place in parallel towards PLMN 3 shown e.g. in FIG. 2 (and towards any other networks as well).

Pre-establishment of user plane connectivity is based on that secure communication (for example based on IPsec tunnel) has been established between the communication device 10 and the INMG-2 function as described above (shown as action 141 in FIG. 14). The communication after this depends on the IPsec mode being used and the description given above for communication between the communication device 10 and SDM-2 also applies for the communication between the communication device 10 and the MMF-2 function. The MMF-2 selection must also take into account the current position of the communication device 10 to ensure that a MMF serving the current area of the communication device 10 is selected in a specific PLMN. The MMF-2 then communicates towards the SMF-2 function that further communicates with the UPF-2 function.

FIG. 14 shows how the communication device 10 in action 144 performs Pre-establishment of user plane connectivity towards the MMF-2, SMF-2 and UPF-2 functions in PLMN 2. Action 141 is same as action 111 in FIG. 11 and actions 144.1 to 144.6 are the same actions as actions 113.1 to 113.6 in FIG. 11 with the exception that in action 144.1 the NAS MM Attach Request message also contains a NAS SM Create PDU Session Request message.

In action 144.7 the first network node i.e. the MMF-2 selects a SMF-2 function and forwards the received NAS SM Create PDU Session Request message to the SMF-2 function (action 144.8). In action 144.9 the SMF-2 selects an UPF-2 function and then creates the user plane connectivity in the UPF-2 (actions 144.10 and 144.11). In action 144.12 the SMF-2 returns a NAS SM Create PDU Session Response to the MMF-2. The MMF-2 then returns a Pre-Attach Response message to the communication device 10 including the preparation indication such as the UE pre-attach identifier and possibly other credentials (action 144.13) including both NAS MM Attach Response and NAS SM Create PDU Session Response messages. The latter message contains all information needed for communication device IP connectivity in MNO 2. The communication device 10 may store the received information in case it would later decide to access the MNO 2 network.

The connection between the MMF-2 and the communication device 10 may be maintained and the MMF-2 may trigger for example the Authentication procedure again and for example with some periodicity.

FIG. 15 shows what happens when the communication device 10 decides to leave PLMN 1 and move to PLMN 2 (action 155) in the case when Pre-establishment of user plane connectivity has been performed in advance between the communication device 10 and the MMF-2, SMF-2 and UPF-2 functions in PLMN 2 (action 154). The main parts are that the communication device 10 includes the preparation indication such as the UE pre-attach identifier and possibly other credentials received during Pre-attach in the Attach Request message sent to the MMF-2 function (actions 156 and 157). The communication device 10 also includes parts of the UE pre-attach identifier in the signaling towards RAN to ensure that the RAN selects the correct MMF function where the pre-attached communication device 10 context exists (for example if GUTI was used as UE pre-attach identifier then S-TMSI part of the GUTI is signaled from the communication device 10 to the RAN). The MMF-2 function uses the received UE pre-authentication identifier and possibly other credentials information to verify the relation between this Attach Request and a stored Pre-Attached communication device context (action 158). In this example the verification is successful and the MMF-2 may return an indication such as Attach Accept to the communication device 10 either directly (not shown in FIG. 15) or as part of continuation of the Attach procedure (action 160). The MMF-2 also realizes that user plane connectivity is already established for the communication device 10 (action 159). The MMF-2 then continues the Attach procedure with the exception that no Authentication, Attach or user plane connectivity related procedures need to be performed, action 160. This speeds up the overall Attach procedure and the communication device 10 gains IP connectivity faster compared to the case when Authentication and other Attach related procedures would need to be performed first when the communication device 10 connects to PLMN 2.

FIG. 16 shows the impact on LTE/EPC Attach procedure for the case when Pre-establishment of user plane connectivity has been performed in advance. The Attach procedure in 5G context is shown in relation to the already standardized LTE/EPC Attach procedure (FIG. 5.3.2.1-1 in 3GPP TS 23.401 v.14.0.0).

The parts that don't need to be performed are highlighted with lined text boxes in FIG. 16. The same parts as shown in FIG. 13 can be skipped, boxes 161 and 162. In addition, user plane connectivity establishment related steps such as actions 12-16 can be skipped, see box 163. FIG. 16 shows that even more steps can be skipped when comparing Pre-establishment of user plane connectivity towards both Pre-attach and Pre-authentication and therefore the access to a PLMN is further optimized as it takes shorter time.

Figure 17:
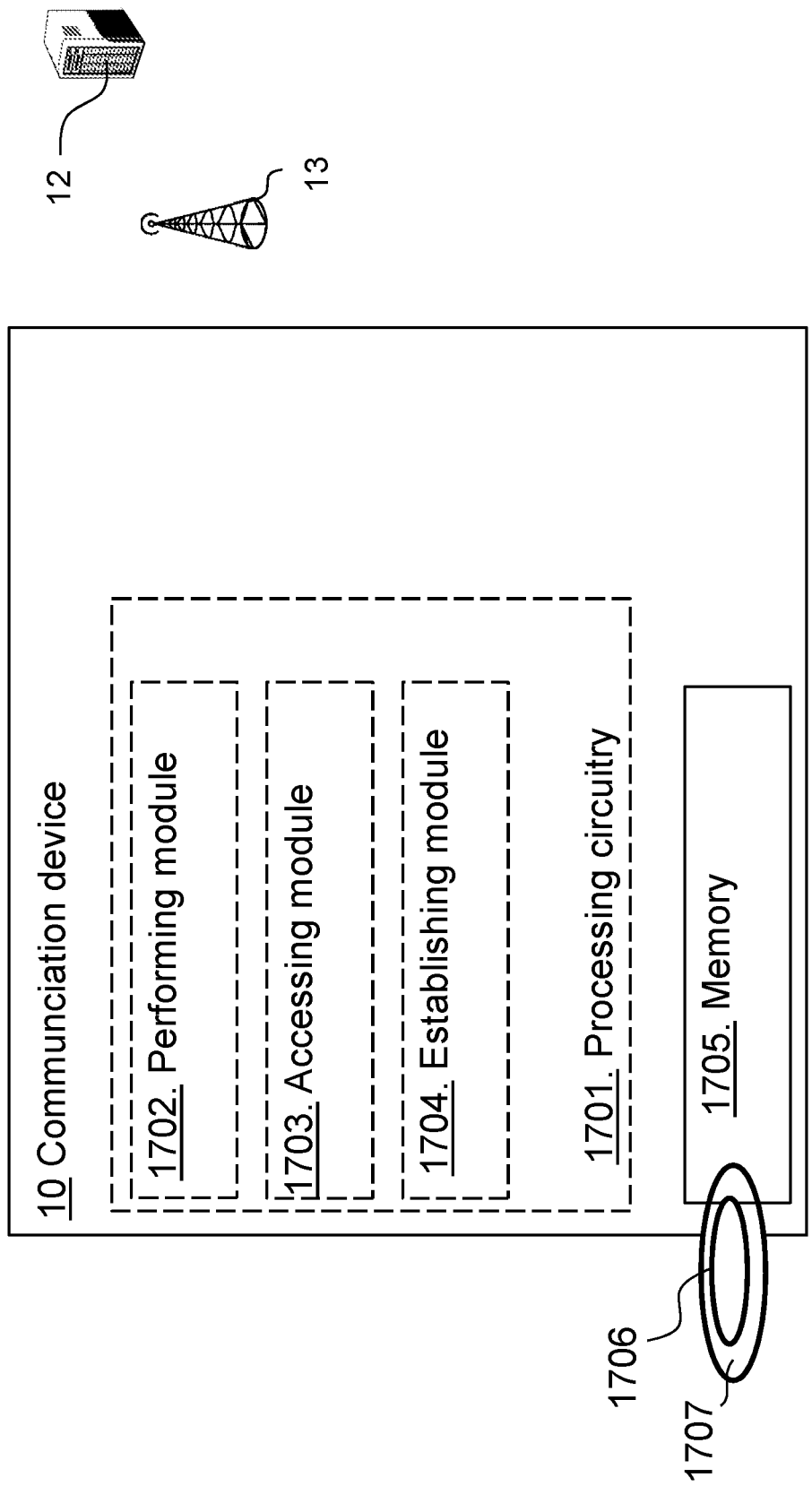
FIG. 17 shows a block diagram depicting a communication device according to embodiments herein.

FIG. 17 is a block diagram depicting the communication device 10 for handling communication in the communication network comprising at least the first wireless communication network 11 and the second wireless communication network 14. The second wireless communication network comprises the radio network node 13 configured to serve the communication device 10.

The communication device 10 may comprise processing circuitry 1701, such as one or more processors, configured to perform the methods herein.

The communication device 10 may further comprise a performing module 1702. The communication device 10, the processing circuitry 1701, and/or the performing module 1702 is configured to perform the preparation signaling, via the radio network node 13 and transparently through the second wireless communication network 14, to the first network node 12 of the first wireless communication network 11 for preparing the first network node 12 with the pre-configuration for serving the communication device 10.

The communication device 10, the processing circuitry 1701, and/or the performing module 1702 may be configured to perform the preparation signaling by pre-authenticating the communication device 10 to the first wireless communication network.

The communication device 10, the processing circuitry 1701, and/or the performing module 1702 may be configured to perform the preparation signaling by pre-attaching the communication device 10 to the first wireless communication network.

The communication device 10, the processing circuitry 1701, and/or the performing module 1702 may be configured to perform the preparation signaling by pre-establishing the user plane connectivity for the communication device 10 in the first wireless communication network.

The communication device 10, the processing circuitry 1701, and/or the performing module 1702 may be configured to perform by providing information, to the first network node 12, for creating context associated with the communication device 10.

The communication device 10, the processing circuitry 1701, and/or the performing module 1702 may be configured to perform by receiving, from the first network node 12, the preparation indication referencing the pre-configuration.

The communication device 10 may further comprise an accessing module 1703. The communication device 10, the processing circuitry 1701, and/or the accessing module 1703 may be configured to initiate the access process to the first wireless communication network, which access process comprises the abbreviated signaling procedure referencing the prepared pre-configuration for serving the communication device. The communication device 10, the processing circuitry 1701, and/or the accessing module 1703 may be configured to provide the preparation indication to the first wireless communication network during the abbreviated signaling procedure.

It should be noted that the communication network may further comprise additional wireless communication networks such as the third wireless communication network and the communication device 10, the processing circuitry 1701, and/or the performing module 1702 may be configured to perform the preparation signaling, via the radio network node 13 and transparently through the second wireless communication network, to the third network node 16 of the third wireless communication network for preparing the third network node with the pre-configuration for serving the communication device.

The communication device 10 may further comprise an establishing module 1704. The communication device 10, the processing circuitry 1701, and/or the establishing module 1704 may be configured to establish the respective connection transparently through the second wireless communication network, to the first wireless communication network and/or the third wireless communication network.

The communication device 10 further comprises a memory 1705. The memory comprises one or more units to be used to store data on, such as UE context, preparation indications, SIM modules, accessing data, applications to perform the methods disclosed herein when being executed, and similar.

The methods according to the embodiments described herein for the communication device 10 are respectively implemented by means of e.g. a computer program 1706 or a computer program product, comprising instructions, i.e., software code portions, which, when executed on at least one processor, cause the at least one processor to carry out the actions described herein, as performed by the communication device 10. The computer program 1706 may be stored on a computer-readable storage medium 1707, e.g. a disc or similar. The computer-readable storage medium 1707, having stored thereon the computer program, may comprise the instructions which, when executed on at least one processor, cause the at least one processor to carry out the actions described herein, as performed by the communication device 10. In some embodiments, the computer-readable storage medium may be a non-transitory computer-readable storage medium.

Figure 18:
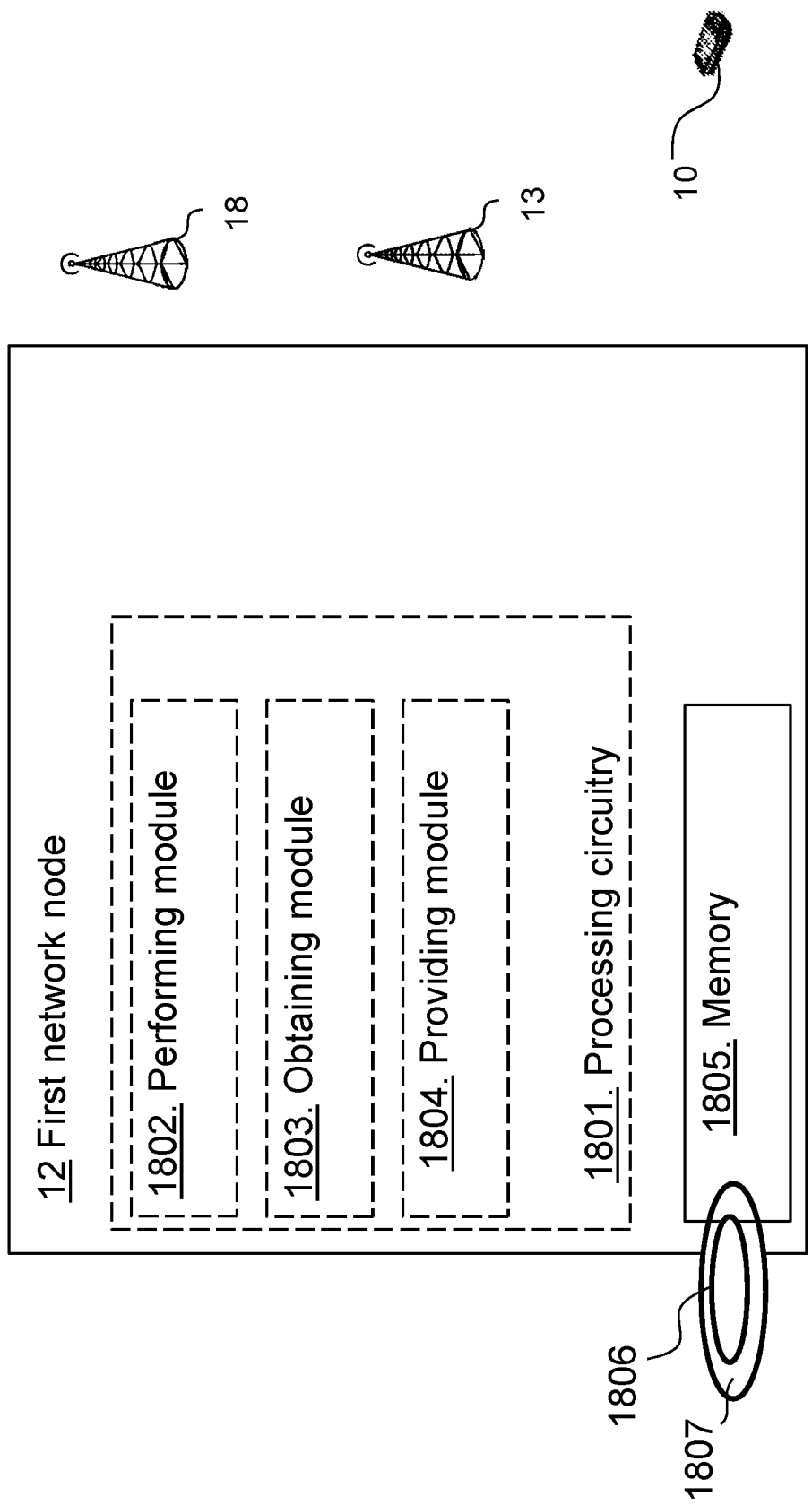
FIG. 18 shows a block diagram depicting a first network node according to embodiments herein.

FIG. 18 is a block diagram depicting the first network node 12, such as an MME or HSS, for handling communication of the communication device 10 in the communication network comprising at least the first wireless communication network and the second wireless communication network. The first network node 12 is configured for the first wireless communication network, and the communication device 10 is served by the radio network node 13 comprised in the second wireless communication network.

The first network node 12 may comprise processing circuitry 1801, e.g. one or more processors, configured to perform the methods herein.

The first network node 12 comprises a performing module 1802. The first network node 12, the processing circuitry and/or the performing module 1802 is configured to perform the preparation signaling with the communication device 10, via the radio network node 13 and transparently through the second wireless communication network, for preparing the first network node with the pre-configuration for serving the communication device 10.

The first network node 12, the processing circuitry and/or the performing module 1802 may be configured to perform the preparation signaling by pre-authenticating the communication device 10 to the first wireless communication network The first network node 12, the processing circuitry and/or the performing module 1802 may be configured to perform the preparation signaling by pre-attaching the communication device to the first wireless communication network.

The first network node 12, the processing circuitry and/or the performing module 1802 may be configured to perform the preparation signaling by pre-establishing the user plane connectivity for the communication device 10 in the first wireless communication network The first network node 12, the processing circuitry and/or the performing module 1802 may be configured to perform the preparation signaling by creating context associated with the communication device 10 based on received information from the communication device, and by storing said context.

The first network node 12, the processing circuitry and/or the performing module 1802 may be configured to perform the preparation signaling by providing, to the communication device 10, the preparation indication referencing the pre-configuration.

The first network node 12 comprises an obtaining module 1803. The first network node 12, the processing circuitry and/or the obtaining module 1803 may be configured to obtain the access indication indicating the initiated abbreviated access process of the communication device 10 to the first wireless communication network, which access indication is referencing the prepared pre-configuration for serving the communication device.

The first network node 12 comprises a providing module 1804. The first network node 12, the processing circuitry and/or the providing module 1804 may be configured to provide information related to the pre-configuration for the communication device for the initiated abbreviated access process. The information may be provided within the first network node, e.g. within the MME, or to another network node, e.g. to an MME in case the first network node is an HSS.

The first network node 12, the processing circuitry and/or the obtaining module 1803 may be configured to obtain the access indication by receiving the preparation indication referencing the pre-configuration.

The first network node 12 further comprises a memory 1805. The memory comprises one or more units to be used to store data on, such as context, preparation indications, access process data, access data, applications to perform the methods disclosed herein when being executed, and similar.

The methods according to the embodiments described herein for the first network node 12 are respectively implemented by means of e.g. a computer program 1806 or a computer program product, comprising instructions, i.e., software code portions, which, when executed on at least one processor, cause the at least one processor to carry out the actions described herein, as performed by the first network node 12. The computer program 1806 may be stored on a computer-readable storage medium 1807, e.g. a disc or similar. The computer-readable storage medium 1807, having stored thereon the computer program, may comprise the instructions which, when executed on at least one processor, cause the at least one processor to carry out the actions described herein, as performed by the first network node 12. In some embodiments, the computer-readable storage medium may be a non-transitory computer-readable storage medium.

FIG. 19 is a block diagram depicting the network node such as an MME for handling communication of the communication device 10 in the communication network comprising at least the first wireless communication network and the second wireless communication network. The network node is configured for the first wireless communication network, and the communication device 10 is served by the radio network node 13 comprised in the second wireless communication network.

The network node may comprise processing circuitry 1901, e.g. one or more processors, configured to perform the methods herein.

The network node comprises an initiating module 1902. The network node, the processing circuitry 1901 and/or the initiating module 1902 is configured to initiate the abbreviated access process, for the communication device, actually initiating the abbreviated access procedure, to the first wireless communication network by being configured to receive, from the communication device, the access indication indicating the abbreviated access process, and the preparation indication referencing the pre-configuration for serving the communication device. The pre-configuration is configured from the preparation signaling from the communication device in the second wireless communication network. The network node, the processing circuitry 1901 and/or the initiating module 1902 is further configured to retrieve information related to the pre-configuration for serving the communication device for the initiated abbreviated access process using the preparation indication.

The network node comprises a retrieving module 1903. The network node, the processing circuitry 1901 and/or the retrieving module 1903 may be configured to retrieve the information from another network node such as an HSS or the same network node, being an MME.

The network node comprises a finalizing module 1904. The network node, the processing circuitry 1901 and/or the finalizing module 1904 may be configured to finalize the abbreviated access process using the retrieved information.

The network node further comprises a memory 1905. The memory comprises one or more units to be used to store data on, such as context, preparation indications, access process data, access data, applications to perform the methods disclosed herein when being executed, and similar.

The methods according to the embodiments described herein for the network node are respectively implemented by means of e.g. a computer program 1906 or a computer program product, comprising instructions, i.e., software code portions, which, when executed on at least one processor, cause the at least one processor to carry out the actions described herein, as performed by the network node. The computer program 1906 may be stored on a computer-readable storage medium 1907, e.g. a disc or similar. The computer-readable storage medium 1907, having stored thereon the computer program, may comprise the instructions which, when executed on at least one processor, cause the at least one processor to carry out the actions described herein, as performed by the network node. In some embodiments, the computer-readable storage medium may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a communication device, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communication devices will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a communication device for handling communication in a communication network comprising at least a first wireless communication network and a second wireless communication network, which communication device is served by a radio network node in the second wireless communication network; the method comprising:

performing a preparation signaling, via the radio network node and transparently through the second wireless communication network, to a first network node of the first wireless communication network for preparing the first network node with a pre-configuration for serving the communication device, wherein performing the preparation signaling comprises pre-establishing a user plane connectivity for the communication device in the first wireless communication network.

2. The method of claim 1, wherein performing the preparation signaling comprises pre-authenticating the communication device to the first wireless communication network.

3. The method of claim 1, wherein performing the preparation signaling comprises pre-attaching the communication device to the first wireless communication network.

4. The method of claim 1, wherein performing the preparation signaling comprises providing information, to the first network node, for creating context associated with the communication device.

5. The method of claim 1, wherein performing the preparation signaling comprises receiving, from the first network node, a preparation indication referencing the pre-configuration.

6. The method of claim 1, further comprising:
initiating an access process to the first wireless communication network, which access process comprises an abbreviated signaling procedure referencing the prepared pre-configuration for serving the communication device.

7. The method of claim 6, wherein the abbreviated signaling procedure comprises providing the preparation indication to the first wireless communication network.

8. The method of claim 1, wherein the communication network further comprises a third wireless communication network and performing the preparation signaling further comprises performing preparation signaling, via the radio network node and transparently through the second wireless communication network, to a third network node of the third wireless communication network for preparing the third network node with the pre-configuration for serving the communication device.

9. The method of claim 1, further comprising:
establishing a respective connection transparently through the second wireless communication network, to the first wireless communication network and/or the third wireless communication network.

10. A method performed by a network node for handling communication of a communication device in a communication network comprising at least a first wireless communication network and a second wireless communication network, which network node is comprised in the first wireless communication network and the communication device is served by a radio network node comprised in the second wireless communication network; the method comprising:
initiating an abbreviated access process, for the communication device, to the first wireless communication network, which abbreviated access process comprises:
receiving, from the communication device, an access indication indicating the abbreviated access process, and
a preparation indication referencing a pre-configuration for serving the communication device, which pre-configuration is configured from a preparation signaling from the communication device in the second wireless communication network; and
retrieving information related to the pre-configuration for serving the communication device for the initiated abbreviated access process using the preparation indication.

11. The method of claim 10, wherein the retrieving is performed from another network node or the same network node.

12. The method of claim 10, further comprising finalizing the abbreviated access process using the retrieved information.

13. The method of claim 10, wherein the method further comprises, prior to initiating the abbreviated access process, performing a preparation signaling with the communication device, via the radio network node and transparently through the second wireless communication network, for preparing the first network node with a pre-configuration for serving the communication device.

14. A communication device for handling communication in a communication network comprising at least a first wireless communication network and a second wireless communication network, which second wireless communication network comprises a radio network node configured to serve the communication device; the communication device comprising:
processing circuitry; and
memory operatively coupled to the processing circuitry and storing program code for execution by the processing circuitry, whereby the communication device is configured to:
perform a preparation signaling, via the radio network node and transparently through the second wireless communication network, to a first network node of the first wireless communication network for preparing the first network node with a pre-configuration for serving the communication device, wherein the preparation signaling comprises pre-establishing a user plane connectivity for the communication device in the first wireless communication network.

15. The communication device of claim 14, wherein the preparation signaling further comprises signaling for any one or more of the following:
pre-authenticating the communication device to the first wireless communication network;
pre-attaching the communication device to the first wireless communication network;
providing information, to the first network node, for creating context associated with the communication device; and
by receiving, from the first network node, a preparation indication referencing the pre-configuration.

16. The communication device of claim 14, wherein the communication device is configured to:
initiate an access process to the first wireless communication network, which access process comprises an abbreviated signaling procedure referencing the prepared pre-configuration for serving the communication device.

17. A network node for handling communication of a communication device in a communication network comprising at least a first wireless communication network and a second wireless communication network, which network node is configured for the first wireless communication network and which communication device is served by a radio network node comprised in the second wireless communication network; the network node comprising:
processing circuitry; and
memory operatively coupled to the processing circuitry and storing program code for execution by the processing circuitry, whereby the communication device is configured to:
initiate an abbreviated access process, for the communication device, to the first wireless communication network by being configured to receive, from the communication device, an access indication indicating the abbreviated access process, and a preparation indication referencing a pre-configuration for serving the communication device, which pre-configuration is configured from a preparation signaling from the communication device in the second wireless communication network; and to retrieve information related to the pre-configuration for serving the communication device for the initiated abbreviated access process using the preparation indication.

18. The network node of claim 17, wherein the network node is configured to retrieve the information from another network node or the same network node.

19. The network node of claim 17, wherein the network node is configured to, prior to initiating the abbreviated access process, perform a preparation signaling with the communication device, via the radio network node and transparently through the second wireless communication network, for preparing the first network node with a pre-configuration for serving the communication device.

* * * * *